US008765304B2

(12) United States Patent
Isozaki et al.

(10) Patent No.: US 8,765,304 B2
(45) Date of Patent: *Jul. 1, 2014

(54) NON-AQUEOUS ELECTROLYTE BATTERY, BATTERY PACK, AND VEHICLE

(71) Applicant: Kabushiki Kaisha Toshiba, Minato-ku (JP)

(72) Inventors: Yoshiyuki Isozaki, Tokyo (JP); Hidesato Saruwatari, Kawasaki (JP); Yoshinao Tatebayashi, Yokohama (JP); Takashi Kuboki, Tokyo (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/920,794

(22) Filed: Jun. 18, 2013

(65) Prior Publication Data

US 2013/0280586 A1     Oct. 24, 2013

Related U.S. Application Data

(63) Continuation of application No. 13/538,233, filed on Jun. 29, 2012, now Pat. No. 8,715,859, which is a continuation of application No. PCT/JP2010/053574, filed on Mar. 4, 2010.

(51) Int. Cl.
*H01M 10/0525* (2010.01)
*H01M 4/131* (2010.01)
*H01M 4/525* (2010.01)
*B60K 1/00* (2006.01)

(52) U.S. Cl.
USPC ........ 429/231.3; 429/188; 429/163; 429/156; 429/231.95; 429/223; 429/224; 429/233; 180/65.31

(58) Field of Classification Search
USPC ........... 429/94, 329, 231.95, 231.1, 233, 204, 429/219, 188, 163, 231.3, 156, 323, 224; 180/65.1
See application file for complete search history.

(56) References Cited

U.S. PATENT DOCUMENTS 7,722,989 B2   5/2010  Ohzuku et al.
7,939,200 B2   5/2011  Ohzuku et al.
(Continued)

FOREIGN PATENT DOCUMENTS

JP   2005-085635   3/2005
JP   2005-142047   6/2005
(Continued)

OTHER PUBLICATIONS

Machine Translation of: JP 2006/185794 A, Asaoka et al., Jul. 13, 2006.*

(Continued)

*Primary Examiner* — Kenneth Douyette
(74) *Attorney, Agent, or Firm* — Oblon, Spivak, McClelland, Maier & Neustadt, L.L.P.

(57) ABSTRACT

According to one embodiment, a non-aqueous electrolyte battery includes an outer case, a negative electrode, a positive electrode including a current collector and a positive electrode layer formed on surface of the current collector and opposed to the negative electrode layer, and a non-aqueous electrolyte, wherein the positive electrode layer includes a layered lithium nickel cobalt manganese composite oxide and a lithium cobalt composite oxide, the positive electrode layer has a pore volume with a pore diameter of 0.01 to 1.0 μm, the pore volume being 0.06 to 0.25 mL per 1 g of a weight of the positive electrode layer, and a pore surface area within the pore volume range is 2.4 to 8 m²/g.

14 Claims, 6 Drawing Sheets

(56) References Cited

U.S. PATENT DOCUMENTS

| | | |
|---|---|---|
| 2003/0082448 A1 | 5/2003 | Cho et al. |
| 2003/0211392 A1* | 11/2003 | Nanjundaswamy et al. . 429/219 |
| 2003/0215717 A1 | 11/2003 | Miyaki |
| 2005/0079416 A1 | 4/2005 | Ohzuku et al. |
| 2005/0202311 A1 | 9/2005 | Higashino et al. |
| 2006/0204845 A1 | 9/2006 | Chang et al. |
| 2006/0234115 A1 | 10/2006 | Watanabe et al. |
| 2007/0009801 A1* | 1/2007 | Inagaki et al. ............ 429/231.95 |
| 2007/0248883 A1* | 10/2007 | Oda et al. ................... 429/231.1 |
| 2008/0081249 A1 | 4/2008 | Kaneko |
| 2008/0166637 A1 | 7/2008 | Inagaki et al. |
| 2008/0176142 A1 | 7/2008 | Inagaki et al. |
| 2009/0169997 A1 | 7/2009 | Saruwatari et al. |

FOREIGN PATENT DOCUMENTS

| | | | | |
|---|---|---|---|---|
| JP | 2005158721 A | 6/2005 | | |
| JP | 2005-317499 | 11/2005 | | |
| JP | 2006185794 A | * 7/2006 | ............. | H01M 4/58 |
| JP | 2008-532221 | 8/2008 | | |
| JP | 2009-224288 | 10/2009 | | |

OTHER PUBLICATIONS

International Search Report issued May 18, 2010 in PCT/JP2010/053574 filed Mar. 4, 2010.

Machine Translation of: JP 2005/158721A, Yamada et al., Jun. 16, 2005.

* cited by examiner

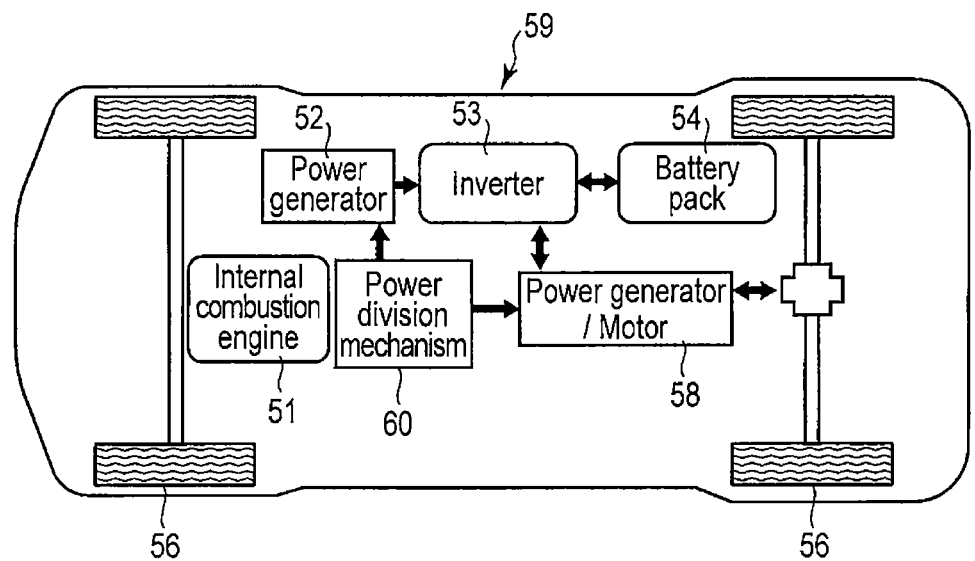
F I G. 8
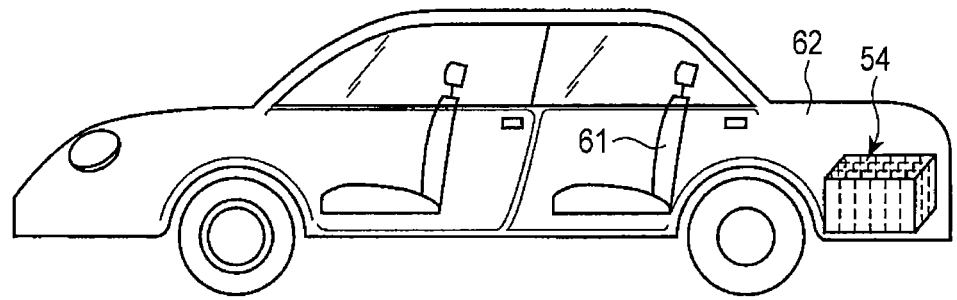
F I G. 9

NON-AQUEOUS ELECTROLYTE BATTERY, BATTERY PACK, AND VEHICLE

CROSS REFERENCE TO RELATED APPLICATIONS

This application is a Continuation Application of U.S. application Ser. No. 13/538,233, filed Jun. 29, 2012, the entire contents of which are incorporated herein by reference, which is a continuation of PCT Application No. PCT/JP2010/053574, filed Mar. 4, 2010, the entire contents of which are incorporated herein by reference.

FIELD

Embodiments described herein relate generally to a non-aqueous electrolyte battery, a battery pack provided with the battery, and a vehicle.

BACKGROUND

A non-aqueous electrolyte battery in which charge/discharge is performed by transfer of a lithium ion between a negative electrode and a positive electrode is actively studied and developed as a high energy density battery.

A non-aqueous electrolyte battery using a lithium transition metal composite oxide as a positive electrode active material and a carbonaceous material as a negative electrode active material has already been commercially available.

In recent years, a non-aqueous electrolyte battery using a lithium titanium composite oxide of which a lithium absorption/desorption potential based on a lithium electrode is high, namely about 1.55 V, as compared to the carbonaceous material, has been put into practical use. Hereinafter, "based on lithium electrode" is sometimes represented by vs. $Li/Li^+$. The lithium titanium composite oxide is excellent in cycle property since a volumetric change caused by charge-discharge is small. Further, since the lithium titanium oxide is free from precipitation of lithium metal in the negative electrode during lithium absorption/desorption, large current charging is enabled.

In the lithium transition metal composite oxide use as the positive electrode active material, a transition metal such as Co, Mn, and Ni is generally used. Examples of a typical lithium transition metal composite oxide include lithium cobalt oxide ($LiCoO_2$). A theoretical capacity of the composite oxide is 274 mAh/g. However, an actual battery in which a positive electrode potential is 4.2 to 4.3 V vs. $Li/Li^+$ is used only about 60% of the theoretical capacity. Therefore, if a charging potential is enabled to higher, use of 70% or more of the theoretical capacity as a positive electrode capacity is enabled, and a high capacity and a high energy density of the battery are realized.

For example, JP-A 2005-085635 (KOKAI) discloses a non-aqueous electrolyte secondary battery which is provided with a positive electrode containing lithium cobalt oxide as a positive electrode active material, a negative electrode containing a graphite material, and an electrolyte solution containing ethylene carbonate as a solvent and is charged with a charge cutoff voltage of 4.3 V or more. In the non-aqueous electrolyte secondary battery, it is capable of attaining an excellent cycle property by using the lithium cobalt oxide as the positive electrode active material, the lithium cobalt oxide being produced by depositing a zirconium compound on the surfaces of a particle thereof.

JP-A 2005-317499 (KOKAI) discloses a non-aqueous electrolyte secondary battery which is capable of attaining a charge cutoff voltage of 4.3 V or more without causing deterioration of a charge-discharge cycle property and thermal stability by using a positive electrode active material which is mixed a lithium transition metal composite oxide A and a lithium transition metal composite oxide B. The composite oxide B is obtained by containing at least both Zr and Mg into $LiCoO_2$. The composite oxide B has a layered structure and containing at least both Mn and Ni as transition metals.

BRIEF DESCRIPTION OF THE DRAWINGS

FIG. 8 is a typical view showing a series-parallel hybrid vehicle according to the third embodiment of the present invention; and FIG. 9 is a typical view showing a vehicle according to the third embodiment of the present invention.

DETAILED DESCRIPTION

Figure 1:
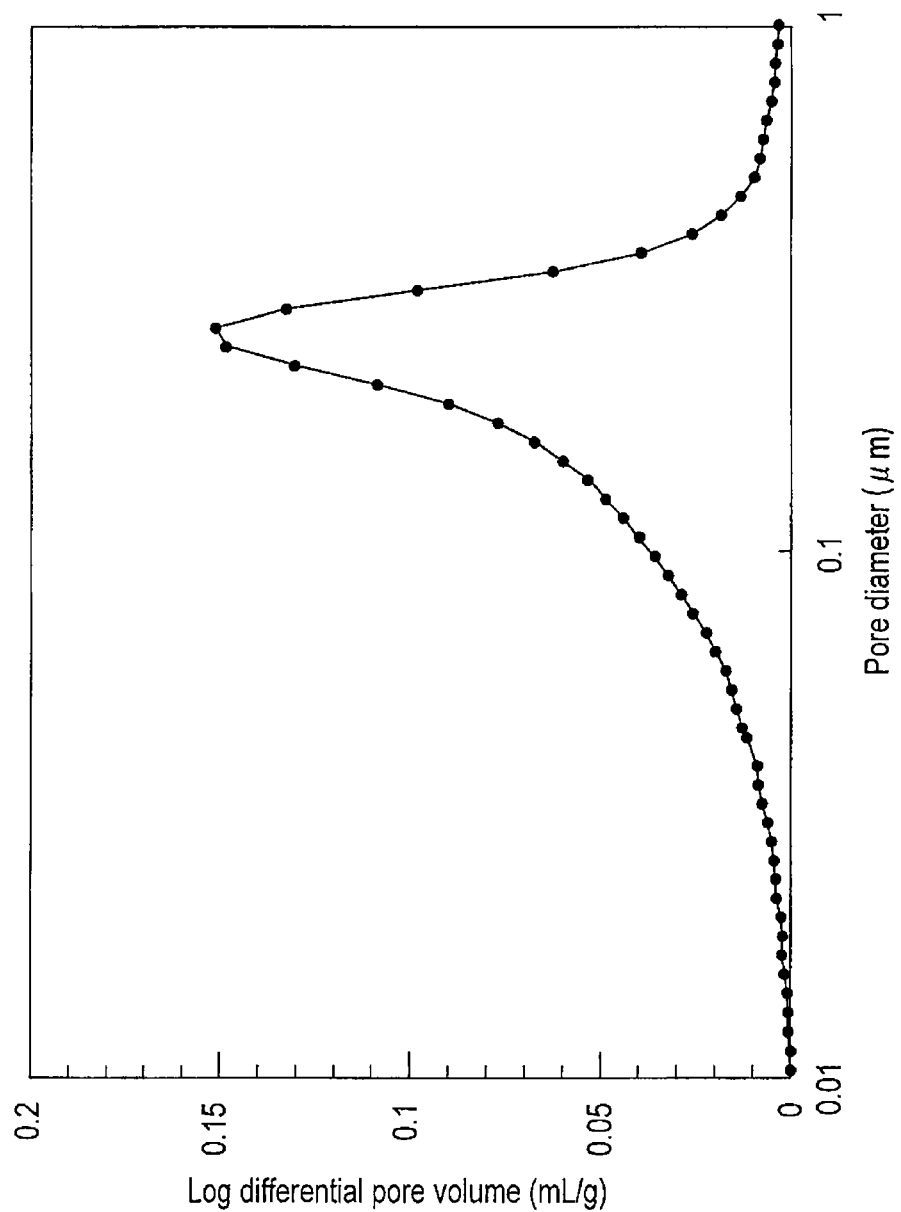
FIG. 1 is a diagram showing a pore diameter distribution detected by a mercury intrusion technique of a positive electrode obtained in Example 1.

Hereinafter, a non-aqueous electrolyte battery according to an embodiment is described below with reference to drawings.

In general, according to one embodiment, a non-aqueous electrolyte battery comprises an outer case, a negative electrode housed in the outer case and comprising a current collector and a negative electrode layer formed on at least one of surfaces of the current collector, a positive electrode housed in the outer case and comprising a current collector and a positive electrode layer formed on at least one of surfaces of the current collector and opposed to the negative electrode layer, and a non-aqueous electrolyte filled in the outer case. The negative electrode comprises an active material having a lithium absorption/desorption potential of 0.4 V vs. $Li/Li^+$ or more. The positive electrode layer of the positive electrode comprises an active material containing a layered lithium nickel cobalt manganese composite oxide and a lithium cobalt composite oxide in which at least a part of a surface thereof is coated with a metal compound.

The positive electrode layer has a pore volume with a pore diameter of 0.01 μm or more and 1.0 μm or less obtained by the mercury press-in method. The pore volume is 0.06 mL or more and 0.25 mL or less per 1 g of a weight of the positive electrode layer excluding a weight of the current collector. A pore surface area within the pore volume range is 2.4 $m^2$/g or more and 8 $m^2$/g or less.

A lithium titanium composite oxide has been known as the active material of the negative electrode having the lithium absorption/desorption potential of 0.4 V (vs. $Li/Li^+$) or more. Since the active material of the negative electrode, e.g., graphite or lithium metal, which absorbs lithium at a potential less than the lithium absorption potential of 0.4 V (vs. Li/Li$^+$), causes formation of a thick film on the surface due to decomposition of the non-aqueous electrolyte solution at an initial charging, electrolyte solution decomposition after the initial charging is suppressed by the film. However, in the lithium titanium composite oxide, since a degree of a decomposition reaction of the electrolyte solution during the initial charging is small, a stable film is hardly formed. As a result, the decomposition reaction of the electrolyte solution continuously proceeds after the initial charging.

The above-described phenomenon is prominent in the case of combined use of a negative electrode containing a lithium titanium composite oxide and a positive electrode comprising a positive electrode active material having a layered lithium nickel cobalt manganese composite oxide and a lithium cobalt composite oxide in which at least a part of a surface thereof is coated with a metal compound.

On the other hand, the decomposition reaction of the electrolyte solution is not prominently seen in the case where the surface of the lithium cobalt composite oxide is not covered with the metal compound. The phenomenon is considered to be caused by the following mechanism. More specifically, it has been known that cobalt (Co) is eluted into the electrolyte solution in the case where the lithium cobalt composite oxide is used as the positive electrode active material. The eluted Co ions are precipitated on a negative electrode surface by charging and suppress the electrolyte solution decomposition which occurs on a surface of the lithium titanium composite oxide as an active material of the negative electrode. As a result, gas generation caused by the electrolyte solution decomposition is suppressed.

In contrast, the above-described the elusion of Co ion into the electrolyte solution is suppressed in the case of using the active material containing the lithium cobalt composite oxide in which at least a part of the surface thereof is coated with the metal compound, the layered nickel cobalt lithium manganate, and the lithium cobalt composite oxide. As a result, Co does not precipitate on the surface of the negative electrode layer, so that it is unable to suppress electrolyte solution decomposition on the surface of the lithium titanium composite oxide as an active material of the negative electrode, therefore, the gas generation becomes prominent.

In view of the above, as for the positive electrode containing the positive electrode active material comprising the layered lithium nickel cobalt manganese composite oxide and the lithium cobalt composite oxide in which at least a part of the surface thereof is coated with the metal compound, the inventors noted the layered lithium nickel cobalt manganese composite oxide which is the active material of the former and conducted an extensive research. As a result, the inventors are found that there can be achieved: facilitation of Co elution from layered nickel cobalt lithium manganate; suppression of electrolyte solution decomposition which occurs on an active material surface having a negative electrode lithium absorption/desorption potential of 0.4 V (vs. Li/Li$^+$) or more; and suppression of gas generation involved in electrolyte solution decomposition and battery expansion by defining a pore volume and a pore surface area of a positive electrode within certain ranges.

Further, a non-aqueous electrolyte battery having the above-described configuration is capable of maintaining a charging potential of the active material in the positive electrode to 4.3 V (vs. Li/Li$^+$) or more and 4.5 V (vs. Li/Li$^+$) or less and is capable of suppressing the battery expansion while maintaining a high energy density and a favorable cycle property.

First Embodiment

Hereinafter, an outer case, a positive electrode, a negative electrode, a non-aqueous electrolyte, and a separator composed of a non-aqueous electrolyte battery according to an embodiment will be described in detail.

1) Outer Case

Examples of a shape of the outer case include a flat shape (thin shape), a square shape, a cylindrical shape, a coin shape, a button shape, and the like. Examples of the outer case include an outer case for a small battery which is mounted on a mobile electronic device and an outer case for a large battery which is mounted on a vehicle having two to four wheels, for example, according to a battery dimension.

For the outer case, a laminate film container having a thickness of 0.5 mm or less or a metal container having a thickness of 1.0 mm or less is used. The metal container may more preferably have a thickness of 0.5 mm or less.

As the laminate film, a multilayer film in which a metal layer is inserted between polymer resin layers may be used. The metal layer may preferably be an aluminum foil or an aluminum alloy foil for attaining a light weight. Examples of the polymer resin include polypropylene (PP), polyethylene (PE), nylon, and polyethylene terephthalate (PET). The laminate film container may be formed into the shape of the outer case by sealing by thermal fusion bonding.

For example, the metal container is made from aluminum or an aluminum alloy. The aluminum alloy may preferably contain an element such as magnesium, zinc, silicone, and the like. In the case where a transition metal such as iron, copper, nickel, and chromium is contained in the alloy, an amount of the transition metal may preferably be 100 ppm by mass or less.

2) Positive Electrode

The positive electrode is provided with a current collector and a positive electrode layer formed on one or both surfaces of the current collector and containing an active material, a conductive agent, and a binder.

The active material has a layered lithium nickel cobalt manganese composite oxide and a lithium cobalt composite oxide in which at least a part of a surface thereof is coated with a metal compound.

As used herein, "layered" means a layered rock salt structure of $\alpha$-NaFeO$_2$ type.

Further, "lithium cobalt composite oxide in which at least a part of a surface thereof is coated with a metal compound" means that 50% or more of the surface of the lithium cobalt composite oxide is covered with the metal compound. Further, "surface" means a portion of a depth of 1 μm or less in a direction toward the center of a particle from an outermost surface of the particle of the lithium cobalt composite oxide.

It is possible to analyze the metal compound present on the surface of the lithium cobalt composite oxide by STEM (Scanning Transmission Electron Microscope)/EDX analysis. It is possible to prepare a sample to be observed by the STEM by mixing a powder with a resin, followed by solidification, and then performing thin film processing by FIB. The TEM observation and the EDX analysis of a particle central part and a particle surface part of the prepared sample are performed. The number of counts attributable to Mg peaks is measured by performing the EDX analysis of 20 points on the surface which are decided at random and a particle interior (bulk). Herein, the feature in which 50% or more of the surface of the lithium cobalt composite oxide is covered with the metal compound, means that "the number of counts of Mg peaks on the surface>the number of counts of Mg peaks in particle interior" is established at 10 or more measurement points among the 20 points decided at random.

In the lithium cobalt composite oxide in which at least a part of the surface is covered with a metal compound, it is preferable that 60% or more is coated with the metal compound according to one aspect, 70% or more is coated with the metal compound according to another aspect, 80% or more is coated with the metal compound according to yet another aspect, or 90% or more is coated with the metal compound according to still another aspect.

The layered lithium nickel cobalt manganese composite oxide may preferably be a compound represented by a general formula $Li_aNi_{1-x-y-z}Co_xMn_yM_zO_2$ (wherein, a, x, y, and z are $0.9<a\leq1.25$, $0<x\leq0.4$, $0<y\leq0.45$, and $0\leq z\leq0.1$, and M represents at least one element selected from Mg, Al, Si, Ti, Zn, Zr, Ca, and Sn). Examples of the layered lithium nickel cobalt manganese composite oxide represented by the general formula include $LiNi_{1/3}Co_{1/3}Mn_{1/3}O_2$, $Li_{1.05}Ni_{1/3}Co_{1/3}Mn_{1/3}O_2$, $LiNi_{0.5}Co_{0.2}Mn_{0.3}O_2$, $Li_{1.05}Ni_{0.5}Co_{0.2}Mn_{0.3}O_2$, $Li_{1.1}Ni_{0.49}Co_{0.2}Mn_{0.3}Mg_{0.01}O_2$, $Li_{1.1}Ni_{0.49}Co_{0.2}Mn_{0.3}Zr_{0.01}O_2$, $Li_{1.1}Ni_{0.5}Co_{0.15}Mn_{0.25}O_2$, $Li_{1.1}Ni_{0.59}Co_{0.15}Mn_{0.25}Mg_{0.01}O_2$, $Li_{1.1}Ni_{0.59}Co_{0.15}Mn_{0.25}Zr_{0.01}O_2$, $Li_{1.1}Ni_{0.75}Co_{0.15}Mn_{0.1}O_2$, $Li_{1.1}Ni_{0.74}Co_{0.15}Mn_{0.1}Mg_{0.01}O_2$, $Li_{1.1}Ni_{0.74}Co_{0.15}Mn_{0.1}Zr_{0.01}O_2$, and the like. Among the above, the composite oxide of which a value of 1-x-y-z is 0.49 or more are preferred since it is possible to attain a high capacity and a high energy density of the battery by using such a composite oxide.

In the lithium cobalt composite oxide of which the surface is coated with the metal compound (hereinafter referred to as metal compound-coated lithium cobalt composite oxide), examples of the metal compound covering the lithium cobalt composite oxide surface include a metal compound containing Mg, Al, or Zr. Examples of the metal compound include an oxide, a phosphate compound, a fluoride, or the like containing at least one metal selected from Mg, Al, and Zr. Specific examples thereof include $Al_2O_3$, MgO, $ZrO_2$, $AlPO_4$, $MgF_2$, and the like. The presence of the compound enables suppression of oxidative decomposition of the non-aqueous electrolyte on the lithium cobalt composite oxide surface.

A proportion of the layered lithium nickel cobalt manganese composite oxide in total amount of the layered lithium nickel cobalt manganese composite oxide and the metal compound-coated lithium cobalt composite oxide may preferably be 60 wt % or more and 95 wt % or less. When the proportion of the layered lithium nickel cobalt manganese composite oxide is 60 wt % or more, it is possible to achieve the effects of the present invention more easily and to sufficiently attain the effect of the energy density increase. A more preferred proportion of the layered lithium nickel cobalt manganese composite oxide is 80 wt % or more and 95 wt % or less.

The layered lithium nickel cobalt manganese composite oxide may preferably have a primary particle diameter of 100 nm or more and 1 μm or less. The layered lithium nickel cobalt manganese composite oxide having the primary particle diameter is easily handled in industrial production and enables lithium ion diffusion in solids to smoothly proceed.

Each of the layered lithium nickel cobalt manganese composite oxide and the metal compound-coated lithium cobalt composite oxide may preferably have an average particle diameter (secondary particle diameter) of 4 μm or more and 15 μm and less. A specific surface area of the layered lithium nickel cobalt manganese composite oxide measured by BET method using $N_2$ adsorption may preferably be 0.1 $m^2$/g or more and 1.2 $m^2$/g or less. It is possible to easily control the pore volume and the pore surface area of the positive electrode within the above defined ranges by using the layered lithium nickel cobalt manganese composite oxide and the metal compound-coated lithium cobalt composite oxide having the above-described characteristics, thereby making it possible to more easily attain the effects of the present invention. A more preferred average particle diameter is 6 μm or more and 10 μm or less, and a more preferred BET specific surface area is 0.2 $m^2$/g or more and 0.8 $m^2$/g or less.

The positive electrode layer may preferably have a porosity of 20% or more and 50% or less. The positive electrode provided with the positive electrode layer having such porosity has a high density and is excellent in affinity with the non-aqueous electrolyte. A more preferred porosity is 25% or more and 40% or less.

A density of the positive electrode layer may preferably be 2.5 g/$cm^3$ or more. When the density of the positive electrode layer is less than 2.5 g/$cm^3$, there is a risk that it is difficult to obtain a positive electrode having the above-described pore volume and pore surface area. A preferred density of the positive electrode layer is 2.5 g/$cm^3$ or more and 3.5 g/$cm^3$ or less.

Examples of the binder include polytetrafluoroethylene (PTFE), polyvinylidene fluoride (PVdF), and a fluorine-based rubber.

Examples of the conductive agent include a carbonaceous material such as acetylene black, carbon black, and graphite.

A mixing ratio among the active material, the conductive agent, and the binder may preferably be such that the active material is 73 wt % or more and 95 wt % or less, the conductive agent is 3 wt % or more and 20 wt % or less, and the binder is 2 wt % or more and 7 wt % or less.

The current collector may preferably be an aluminum foil or an aluminum alloy foil. The aluminum foil and the aluminum alloy foil may preferably have an average crystal grain diameter of 50 μm or less. Since the aluminum foil or the aluminum alloy foil having the average crystal grain diameter of 50 μm or less is dramatically increased in strength and thus enables production of the positive electrode at a high pressing pressure, it is possible to attain the high density of the aluminum foil or the aluminum alloy foil, thereby making it possible to increase a battery capacity. A more preferred average crystal grain diameter is 30 μm or less, and a further preferred average crystal grain diameter is 5 μm or less.

It is possible to measure the average crystal grain diameter of the aluminum foil and the aluminum alloy foil by the following method. The number n of crystal grains present in 1 mm×1 mm is detected by constitution observation of a constitution of a foil surface using an optical microscope. An average crystal grain area S is obtained by using n, i.e. from $S=1\times10^6/n$ ($\mu m^2$). An average crystal grain diameter d (μm) is calculated from the following expression (A):

$$d=2(S/\pi)^{1/2} \quad\quad\quad (A)$$

The average crystal grain diameter of the aluminum foil and the aluminum alloy foil is subjected to complicated influences from a plurality of factors such as a material constitution, impurity, processing conditions, heat treatment history, and annealing conditions. It is possible to adjust the crystal grain diameter by combining the factors during current collector production process.

A thickness of the aluminum foil and the aluminum alloy foil may be 20 μm or less, preferably 15 μm or less.

Purity of the aluminum foil may preferably be 99 wt % or more. As the aluminum alloy, an alloy containing an element such as magnesium, zinc, and silicone is preferred. A content of the transition metal such as iron, copper, nickel, and chromium may preferably be 1 mass % or less.

The positive electrode has the following properties.

A pore volume with a pore diameter of 0.01 μm or more and 1.0 μm or less obtained by the mercury press-in method is 0.06 mL or more and 0.25 mL or less per 1 g of a weight of the positive electrode excluding a weight of the current collector (weight of the positive electrode layer). When the pore volume is less than 0.06 mL/g, it is difficult to satisfactorily retain the non-aqueous electrolyte in the positive electrode (positive electrode layer), thereby incurring a risk of deterioration of cycle property. On the other hand, when the pore volume exceeds 0.25 mL, it is difficult to increase the density of the positive electrode, and there is a risk of deterioration of output property due to a reduction in energy density and lack of electron conductivity. A more preferred pore volume is 0.079 mL/g or more and 0.17 mL/g or less.

A pore surface area of a diameter of 0.01 μm or more and 1.0 μm or less obtained by the mercury press-in method is 2.4 $m^2/g$ or more and 8 $m^2/g$ or less per 1 g of the weight of the positive electrode excluding the weight of the current collector (weight of positive electrode layer). When the pore surface area is less than 2.4 $m^2/g$, it is difficult to cause elution of cobalt (Co) from the active material (particularly from layered lithium nickel cobalt manganese composite oxide) of the positive electrode, thereby making it difficult to suppress decomposition of the non-aqueous electrolyte. On the other hand, when the pore surface area exceeds 8 $m^2/g$, it is difficult to increase the density of the positive electrode, and there is a risk of deterioration of output property due to a reduction in energy density and lack of electron conductivity. A more preferred pore surface area is 2.8 $m^2/g$ or more and 5 $m^2/g$ or less.

As a pore diameter distribution of the positive electrode, a mode diameter which indicates a relationship between the pore diameter detected by mercury intrusion and an increased pore volume capacity within the range of the pore diameter of 0.01 μm or more and 1.0 μm or less may preferably be 0.1 μm or more and 0.25 μm or less.

As used herein, "mode diameter" means a modal particle diameter.

The above-described positive electrode is produced by 1) slurry preparation including suspending the active material, the conductive agent (carbonaceous material), and the binder into a widely-used solvent and 2) positive electrode layer formation including coating the current collector with the slurry and drying and rolling. The process steps will specifically be described in the following.

(Slurry Preparation)

The active material, the conductive agent, and the binder are introduced into a small amount of a solvent, followed by kneading using a planetary mixer in a state where a solid content ratio (ratio of the active material, the conductive agent, and the binder to the solvent) is large to impart a strong shearing force, thereby attaining uniform dispersion. In this step, when the solid content ratio is not high enough, the shearing force is diminished, and pulverization of the aggregated active material becomes insufficient, thereby causing nonuniform dispersion of the solid content. After the sufficient kneading in the high solid content ratio state, a viscosity is adjusted to that suitable for coating by gradually reducing the solid content ratio by adding the solvent. The slurry which is adjusted to the viscosity suitable for coating is further sufficiently mixed by using a bead mill with ceramic beads. In this step, the positive electrode having the above-described pore volume and pore surface area is obtained as a result of generation of cracks of the active material particles and pulverization of a part of the active material particles to primary particles. In other words, it is possible to control the pore volume and the pore surface area depending on mixing conditions (e.g. rotation speed) in the bead mill.

It is possible to produce the ceramic beads from various materials such as glass, alumina, mullite, and silicone nitride. Among these materials, zirconia beads are preferred from the viewpoints of abrasion resistance and impact resistance.

A diameter of the ceramic beads may preferably be 0.5 to 5 mm. When the diameter of the beads is less than 0.5 mm, an impact power is reduced. On the other hand, when the diameter of the beads exceeds 5 mm, a contact area between the beads is reduced to deteriorate kneading capability. A more preferred diameter of the beads is 1 to 3 mm.

(Positive Electrode Production)

The positive electrode is produced by forming a positive electrode layer by coating and drying the obtained slurry on a current collector, followed by rolling using a roll press machine or the like.

A rolling temperature during the rolling may preferably be 40° C. to 180° C. If the rolling temperature is low, the conductive agent having a smaller specific weight than the active material is floated on the positive electrode surface during rolling. As a result, the positive electrode (positive electrode layer) having the appropriate pores and high density is not obtained, thereby incurring a risk of deterioration of an impregnation property (retention) of the non-aqueous electrolyte. Further, there is a risk of deterioration of a battery property. On the other hand, when the rolling temperate exceeds 180° C., crystallization of the binder is promoted to reduce flexibility of the positive electrode layer. Accordingly, the positive electrode layer can easily be split off or detached. As a result, there is a risk of productivity deterioration and deterioration of battery property such as output property and charge-discharge cycle property. A more preferred rolling temperature is 90° C. to 150° C.

A basis weight of the positive electrode layer to be formed on the current collector may preferably be 100 $g/m^2$ or more and 200 $g/m^2$ or less. As used herein, "basis weight" means a weight of the positive electrode layer per unit area (1 $m^2$). When the basis weight of the positive electrode layer is less than 100 $g/m^2$, it is difficult to attain the high density of the positive electrode, thereby making it difficult to attain a high capacity and a high energy density of a battery. When the basis weight of the positive electrode layer exceeds 200 $g/m^2$, flexibility of the positive electrode layer is reduced to easily cause split and detachment. A more preferred basis weight of the positive electrode layer is 120 $g/m^2$ or more and 180 $g/m^2$ or less.

3) Negative Electrode

The negative electrode comprises a current collector and a negative electrode layer formed on one or both surfaces of the current collector. The negative electrode layer contains an active material having a lithium absorption/desorption potential of 0.4 V (vs. Li/Li$^+$) or more and a conductive agent.

An upper limit of the lithium absorption/desorption potential of the active material may preferably be 3 V (vs. Li/Li$^+$). A more preferred lithium absorption/desorption potential is 0.4 V (vs. Li/Li$^+$) or more and 2 V (vs. Li/Li$^+$) or less.

The active material which is capable of absorbing lithium at 0.4 V (vs. Li/Li$^+$) or more and 3 V (vs. Li/Li$^+$) or less may preferably be a metal oxide, a metal sulfide, a metal nitride, or an alloy.

Examples of the metal oxide include titanium-containing metal composite oxide, a tin-based oxide such as $SnB_{0.4}P_{0.6}O_{3.1}$ or $SnSiO_3$, a silicone-based oxide such as SiO, a tungsten-based oxide such as $WO_3$. Among the above, the titanium-containing metal composite oxide is preferred.

The titanium-containing metal composite oxide contains at least titanium as a metal component of a metal oxide, and examples thereof include a titanium oxide and a titanium-metal composite oxide. Specific examples of the titanium-containing metal composite oxide include a titanium-based oxide which does not contain lithium when an oxide is synthesized, a lithium titanium oxide having a spinel structure or a ramsdellite structure, and a lithium titanium composite oxide in which a part of constituent elements of a lithium titanium oxide is substituted with a different element. Examples of the lithium titanium oxide having spinel structure include $Li_{4+x}Ti_5O_{12}$ (x varies according to charge-discharge reaction within a range of $0 \leq x \leq 3$). Examples of the lithium titanium oxide having ramsdellite structure include $Li_{2+y}Ti_3O_7$ (y varies according to charge-discharge reaction within a range of $0 \leq y \leq 3$).

Examples of the titanium-based oxide include $TiO_2$, or a metal composite oxide containing Ti and at least one element selected from the group consisting of P, V, Sn, Cu, Ni, Co, and Fe. $TiO_2$ may preferably be of anatase type and may preferably have a low crystallization property at heat treatment temperature of 300° C. to 500° C. Examples of the metal composite oxide containing Ti and at least one element selected from the group consisting of P, V, Sn, Cu, Ni, Co, and Fe include $TiO_2$—$P_2O_5$, $TiO_2$—$V_2O_5$, $TiO_2$—$P_2O_6$—$SnO_2$, and $TiO_2$—$P_2O_5$-MeO (Me is at least one element selected from the group consisting of Cu, Ni, Co, and Fe). The metal composite oxide may preferably have a microstructure in which a crystal phase and an amorphous phase are coexistent or an amorphous phase alone is present. The metal composite oxide having the microstructure is capable of largely improving the cycle property.

Among the titanium-containing metal composite oxides, the lithium titanium oxide and the metal composite oxide containing Ti and at least one element selected from the group consisting of P, V, Sn, Cu, Ni, Co, and Fe are preferred. A particularly preferred titanium-containing metal composite oxide is the lithium titanium oxide having spinel structure.

Examples of the metal sulfide include a titanium-based sulfide such as $TiS_2$, a molybdenum-based sulfide such as $MoS_2$, an iron-based sulfide such as FeS, $FeS_2$, and $Li_xFeS_2$ ($0 \leq x \leq 4$).

Examples of the metal nitride include lithium-based nitride [e.g. $(Li, Me)_3N$ (Me is a transition metal)].

The active material may preferably have an average particle diameter of 1 μm or less. For example, voids (mesopores) belonging to the second peak are present in the lithium titanium oxide having spinel structure with an average particle diameter of 1 μm. This is caused by reason that the mesopores are generated on a crystal grain boundaries due to a small crystal size caused by insufficient growth of grains of the crystal, or that the mesopores and voids (macropores) belonging to the first peak are introduced during pulverization after calcination. However, when the average particle diameter is too small, distribution of the non-aqueous electrolyte is biased to the negative electrode side to incur a risk of depletion of the electrolyte in the positive electrode. Therefore, a lower limit of the average particle diameter may preferably be set to 0.001 μm.

The active material may preferably have a specific surface area of 5 $m^2/g$ or more and 50 $m^2/g$ or less measured by BET method using $N_2$ adsorption while having the average particle diameter of 1 μm or less. The negative electrode containing the active material having the above-described average particle diameter and specific surface area may improve impregnation property (retention) of the non-aqueous electrolyte.

The conductive agent may preferably be a carbonaceous material. Examples of the carbonaceous material include acetylene black, carbon black, cokes, carbon fiber, and graphite. A more preferred carbonaceous material is cokes having an average particle diameter of 10 μm or less, graphite, carbon fiber having an average particle diameter of 1 μm or less, which are subjected to a heat treatment at a temperature of 800° C. to 2000° C. A BET specific surface area of the carbonaceous material measured by $N_2$ adsorption may preferably be 10 $m^2/g$ or more.

As the conductive agent, only the carbonaceous material may be used, and a metal powder such as an aluminum powder or a conductive ceramic such as TiO may be used in combination.

The negative electrode may contain a binder. Examples of the binder include polytetrafluoroethylene (PTFE), polyvinylidene fluoride (PVdF), a fluorine-based rubber, a styrene butadiene rubber, and a core-shell binder.

A ratio among the active material, the conductive agent, and the binder may preferably be within a range in which the active material is 70 wt % or more and 96 wt % or less, the conductive agent is 2 wt % or more and 28 wt % or less, and the binder is 2 wt % or more and 28 wt % or less. When the amount of the conductive agent is 2 wt % or less, a current collection property of the negative electrode layer is deteriorated to incur a risk of deterioration of a large current property of the non-aqueous electrolyte battery. Further, when the amount of the binder is less than 2 wt %, binding between the negative electrode layer and the current collector is deteriorated to cause possibility of cycle property deterioration. On the other hand, from the viewpoint of high capacity, each of the conductive agent and the binder may preferably be 28 wt % or less.

The negative electrode layer may preferably have a porosity of 20% or more and 50% or less. The negative electrode layer having such porosity is excellent in affinity with the non-aqueous electrolyte and is capable of attaining a high density. A preferred porosity is 25% or more and 40% or less.

The negative electrode layer may preferably have a density of 2 $g/cm^3$ or more. A more preferred density of the negative electrode layer is 2 $g/cm^3$ or more and 2.5 $g/cm^3$ or less.

The current collector may preferably be an aluminum foil or an aluminum alloy foil. The aluminum foil and the aluminum alloy foil may preferably have an average crystal grain diameter of 50 μm or less. Since the aluminum foil or the aluminum alloy foil having the average crystal grain diameter of 50 μm or less is dramatically increased in strength and thus enables production of the negative electrode at a high pressing pressure, the aluminum foil or the aluminum alloy foil can attain the high density, thereby making it possible to increase a battery capacity. Further, since it is possible to prevent deterioration by melting and corrosion of the current collector at an excessive discharge cycle in a high temperature environment (40° C. or more), it is possible to suppress an increase in negative electrode impedance. Further it is possible to improve an output property, rapid charging, and a charge-discharge cycle property. A more preferred average crystal grain diameter is 30 μm or less, and a further preferred average crystal grain diameter is 5 μm or less.

It is possible to measure the average crystal grain diameter of the aluminum foil and the aluminum alloy foil by the same method as described in the positive electrode above.

A thickness of the aluminum foil and an aluminium alloy foil may preferably be 20 μm or less, more preferably 15 μm or less.

Purity of the aluminum foil may preferably be 99 wt % or more. As the aluminum alloy, an alloy containing an element such as magnesium, zinc, and silicone is preferred. On the other hand, a content of a transition metal such as iron, copper, nickel, and chromium may preferably be 1 wt % or less.

The negative electrode is produced by preparing a slurry by suspending the active material, the conductive agent (carbonaceous material), and the binder into a widely-used solvent, producing a negative electrode layer by coating and drying the slurry on a current collector, and pressing.

The slurry preparation is conducted by the following method. The active material, the conductive agent, and the binder are introduced into a small amount of a solvent, followed by kneading using a planetary mixer in a state where a solid content ratio (ratio of the active material, the conductive agent, and the binder to the solvent) is large to impart a strong shearing force, thereby attaining uniform dispersion. In this case, when the solid content ratio is not high enough, the shearing force is diminished, and pulverization of the aggregated active material becomes insufficient, thereby causing nonuniform dispersion of the solid content. This step is more important as the particle diameter of the active material is reduced, and this step is particularly important when handling particles having an average particle diameter of 1 μm or less. After the sufficient kneading in the high solid content ratio state, a viscosity is adjusted to that suitable for coating by gradually reducing the solid content ratio by adding the solvent. The slurry which is adjusted to the viscosity suitable for coating is further sufficiently mixed by using a bead mill using ceramic beads. By this step, edges of the active material particles are trimmed off to smoothen the surfaces of the active material particles, thereby enabling high density filling.

The beads can be used various materials such as glass, alumina, mullite, and silicone nitride for the ceramic beads. Zirconia beads are preferred from the viewpoints of abrasion resistance and impact resistance.

A diameter of the ceramic beads may preferably be 0.5 to 5 mm. When the diameter of the beads is less than 0.5 mm, an impact power is reduced. On the other hand, when the diameter of the beads exceeds 5 mm, a contact area between the beads is reduced to deteriorate kneading capability. A more preferred diameter of the beads is 1 to 3 mm.

After coating and drying the obtained slurry on the current collector, rolling by a roll press machine or the like is performed, thereby completing the negative electrode. A roller may preferably have a temperature of 40° C. to 180° C. When the rolling temperature is less than 40° C., the conductive agent having a smaller specific weight than the active material is floated on the surface of the negative electrode layer at rolling. As a result, the negative electrode having the negative electrode layer having the appropriate pores and high density is not obtained, thereby deteriorating the impregnation property of the non-aqueous electrolyte. Further, the battery property is deteriorated. When the rolling temperate exceeds 180° C., crystallization of the binder is promoted to reduce flexibility of the negative electrode layer. Accordingly, the negative electrode layer can easily be split off or detached. As a result, productivity can be deteriorated, and the battery property such as an output property and a charge-discharge cycle property can be deteriorated. A more preferred rolling temperature is 90° C. to 150° C.

4) Non-Aqueous Electrolyte

Examples of the non-aqueous electrolyte include a liquid non-aqueous electrolyte prepared by dissolving an electrolyte into an organic solvent, a gel non-aqueous electrolyte obtained by compositing a liquid electrolyte and a polymer material, and the like.

It is possible to prepare the liquid non-aqueous electrolyte by dissolving the electrolyte into the organic solvent at a concentration of 0.5 mol/L or more and 2.5 mol/L or less.

Examples of the electrolyte include lithium salts of lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethasulfonate ($LiCF_3SO_3$), and lithium bistrifluoromethylsulfonylimito[$LiN(CF_3SO_2)_2$] or a mixture thereof. The electrolyte may preferably be hardly-oxidative though it may have a high potential, and $LiPF_6$ is most preferred.

Examples of the organic solvent include a cyclic carbonate such as propylene carbonate (PC), ethylene carbonate (EC), and vinylene carbonate; a chained carbonate such as diethyl carbonate (DEC), dimethyl carbonate (DMC), and methylethyl carbonate (MEC); a cyclic ether such as tetrahydrofuran (THF), 2-methyltetrahydrofuran (2MeTHF), and dioxolan (DOX); a chained ether such as dimethoxyethane (DME) and diethoxyethane (DEE); γ-butyrolactone (GBL); acetonitrile (AN); and sulfolane (SL). These organic solvents may be used alone or in the form of a mixed solvent.

Examples of the polymer material include polyvinylidene fluoride (PVdF), polyacrylonitrile (PAN), and polyethylene oxide (PEO).

A preferred organic solvent is a mixed solvent obtainable by mixing two or more selected from the group consisting of propylene carbonate (PC), ethylene carbonate (EC), and γ-butyrolactone (GBL). A more preferred organic solvent is γ-butyrolactone (GBL). More specifically, the lithium titanium composite oxide to be used for the active material of the negative electrode absorbs and desorbs lithium ions in a potential range of about 1 to 2 V (vs. Li/Li$^+$). However, since it is difficult to cause reductive decomposition of the non-aqueous electrolyte within the potential range, it is difficult to form a film which is a reduction product of the non-aqueous electrolyte on the surface of the lithium titanium composite oxide. Therefore, a so-called self-discharge which is gradual diffusion of the lithium ions absorption in the lithium titanium composite oxide occurs during storage in a lithium absorption state, i.e. in a charged state. The self-discharge becomes prominent when the battery is stored in the environment of a high temperature.

Among the organic solvents, γ-butyrolactone is easily reduced as compared to the chained carbonate and the cyclic carbonate. More specifically, reducibility is high in order of γ-butyrolactone>>>ethylene carbonate>propylene carbonate>>dimethyl carbonate>methylethyl carbonate>diethyl carbonate. Therefore, it is possible to form a favorable film on the surface of the lithium titanium composite oxide within the operation potential range of the lithium titanium composite oxide when the electrolyte solution contains γ-butyrolactone. As a result, the self-discharge is suppressed, and it is possible to improve a high temperature storage property of the non-aqueous electrolyte battery.

Likewise, the mixed solvent obtainable by mixing two or more selected from the group consisting of propylene carbonate (PC), ethylene carbonate (EC), and γ-butyrolactone (GBL) described above, particularly, the mixed solvent containing γ-butyrolactone are capable of suppressing self-discharge and improving a high temperature storage property of the non-aqueous electrolyte battery.

The γ-butyrolactone is preferred since γ-butyrolactone is capable of forming the favorable protection film when it is contained in an amount of 40 vol % or more and 95 vol % or less relative to the organic solvent.

5) Separator

Examples of the separator include a porous film containing polyethylene, polypropylene, batteryulose, or polyvinylidene fluoride (PVdF), a synthetic resin non-woven cloth, and the like. Among the above, the porous film made from polyethylene or polypropylene is preferred from the viewpoint of safety improvement since such porous film is capable of melting at a certain temperature and cutting off a current.

Hereinafter, a non-aqueous electrolyte battery according to the embodiment will specifically be described with reference to FIG. 2 and FIG. 3. Components which are common throughout the embodiments are denoted by an identical reference numeral, and overlapping description is omitted. Further, each of the drawings is schematically illustrated for the purpose of description and understanding of the invention. Though some of shapes, dimensions, ratios, etc. of the devices shown in the drawings may be different from those of an actual device, the shapes, dimensions, and ratios may be appropriately redesigned or modified by taking the following description and common general technical knowledge into consideration.

Figure 2:
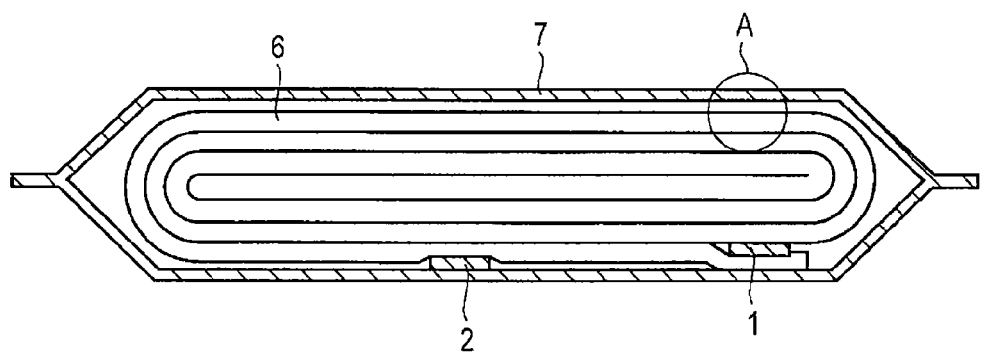
FIG. 2 is a sectional view showing a flat non-aqueous electrolyte battery according to a first embodiment.

With reference to FIG. 2, a wound electrode group 6 which is wound into a flat shape is housed an outer case 7. The wound electrode group 6 has a structure that a positive electrode 3, a negative electrode 4, and a separator located between the positive electrode 3 and the negative electrode 4 are wound into the flat, spiral shape. A non-aqueous electrolyte is retained in the wound electrode group 6.

Figure 3:
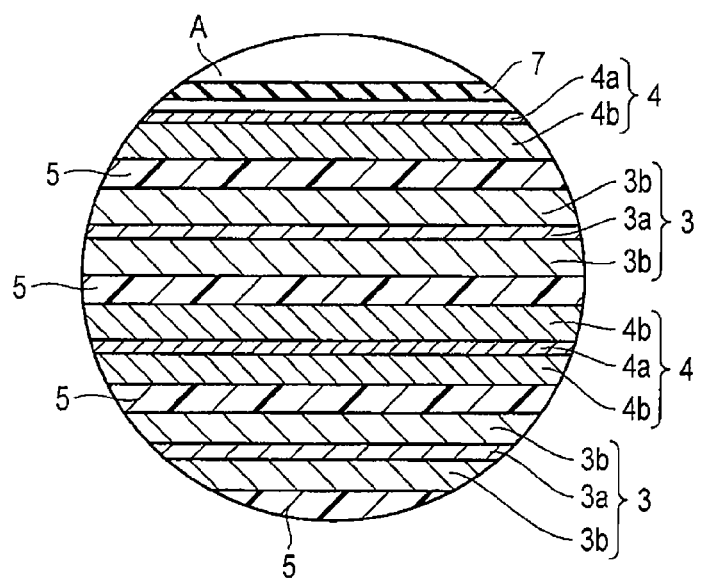
FIG. 3 is an enlarged sectional view showing Part A of FIG. 2.

Referring to FIG. 3, the negative electrode 4 is positioned at an outermost periphery of the wound electrode group 6. In a direction toward an inner periphery from the negative electrode 4, the separator 5, the positive electrode 3, the separator 5, the negative electrode 4, the separator 5, the positive electrode 3, and the separator 5 are positioned in this order. The negative electrode 4 is provided with a current collector 4a and a negative electrode layer 4b formed on each of both surfaces of the current collector 4a. At an outermost periphery part of the negative electrode 4, the negative electrode layer 4b is formed only on one surface of the current collector 4a. The positive electrode 3 is provided with a current collector 3a and a positive electrode layer 3b formed on each of both surfaces of the current collector 3a.

As shown in FIG. 2, one end of a belt-like positive electrode terminal 1 is electrically connected to the current collector 3a of the positive electrode 3 positioned near an outer periphery end of the wound electrode group 6. One end of a belt-like negative electrode terminal 2 is electrically connected to the current collector 4a of the negative electrode 4 positioned near an outer periphery end of the wound electrode group 6. Each of the other ends of the positive electrode terminal 1 and the negative electrode terminal 2 is led to the outside from the same side of the outer case 7.

In the non-aqueous electrolyte battery according to the present embodiment, it is possible to suppress gas generation involved in decomposition of an electrolyte solution. That is, since the positive electrode has the positive electrode layer containing the layered lithium nickel cobalt manganese composite oxide and the lithium cobalt composite oxide in which at least a part of a surface thereof is coated with a metal compound as the active materials and is maintaining a pore volume and a pore surface area within the predetermined range, it can be provided the non-aqueous electrolyte battery which has a high capacity and an excellent cycle property and of which the outer case is hardly expanded.

Further, a battery pack provided with an assembled battery having a plurality of the non-aqueous electrolyte batteries is particularly suitable for use in vehicle.

Second Embodiment

A battery pack according to a second embodiment is provided with one or more of the non-aqueous electrolyte battery according to the first embodiment as a unit battery. In the case where a plurality of unit batteries provided, the unit batteries are electrically connected in series or parallel to form an assembled battery.

One example of the battery pack according to the second embodiment will be described with reference to FIG. 4 and FIG. 5.

Figure 4:
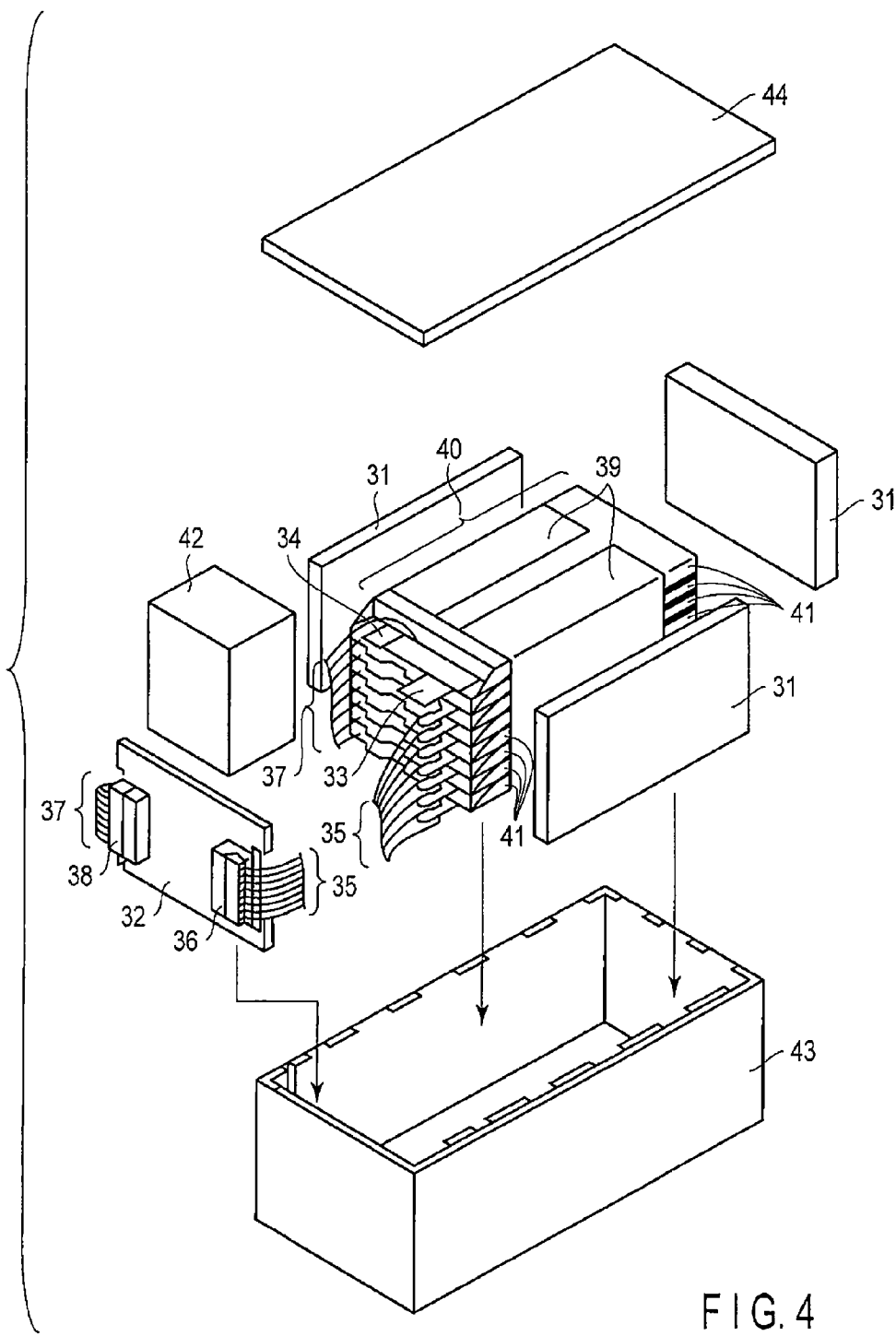
FIG. 4 is an exploded perspective view showing a battery pack according to a second embodiment of the present invention.

FIG. 4 is an exploded perspective view showing the battery pack according to the second embodiment.

As shown in FIG. 4, a plurality of (for example, 8) flat plate-like unit batteries 41 are laminated in a thickness direction to form a battery laminate body 40 having a rectangular shape, i.e. to form an assembled battery. In each of the unit batteries 41, a positive electrode terminal 33 and a negative electrode terminal 34 connected to a positive electrode and a negative electrode are led out of an outer case as described in the foregoing. A printed wiring board 32 is disposed on a lateral surface in which the positive electrode terminal 33 and the negative electrode terminal 34 are projected.

The positive electrode terminal 33 is electrically connected to a positive electrode connector 36 via a positive electrode wiring 35. The negative electrode terminal 34 is electrically connected to a negative electrode connector 38 via a negative electrode wiring 37.

The laminate body 40 of the unit battery 41 is fixed by an adhesive tape 39. A protection sheet 31 made from a rubber or a resin is disposed on three surfaces of the laminate body 40 excluding the lateral surface in which the positive electrode terminal 33 and the negative electrode terminal 34 are projected. A block-like protection block 42 made from a rubber or a resin is disposed between the lateral surface in which the positive electrode terminal 33 and the negative electrode terminal 34 are projected and the printed wiring board 32.

The laminate body 40 is housed in a housing vessel 43 together with the protection sheet 31, the protection block 42, and the printed wiring board 32. A cover 44 is provided on an upper surface of the housing vessel 43.

Hereinafter, each of the components will be described in detail.

Figure 5:
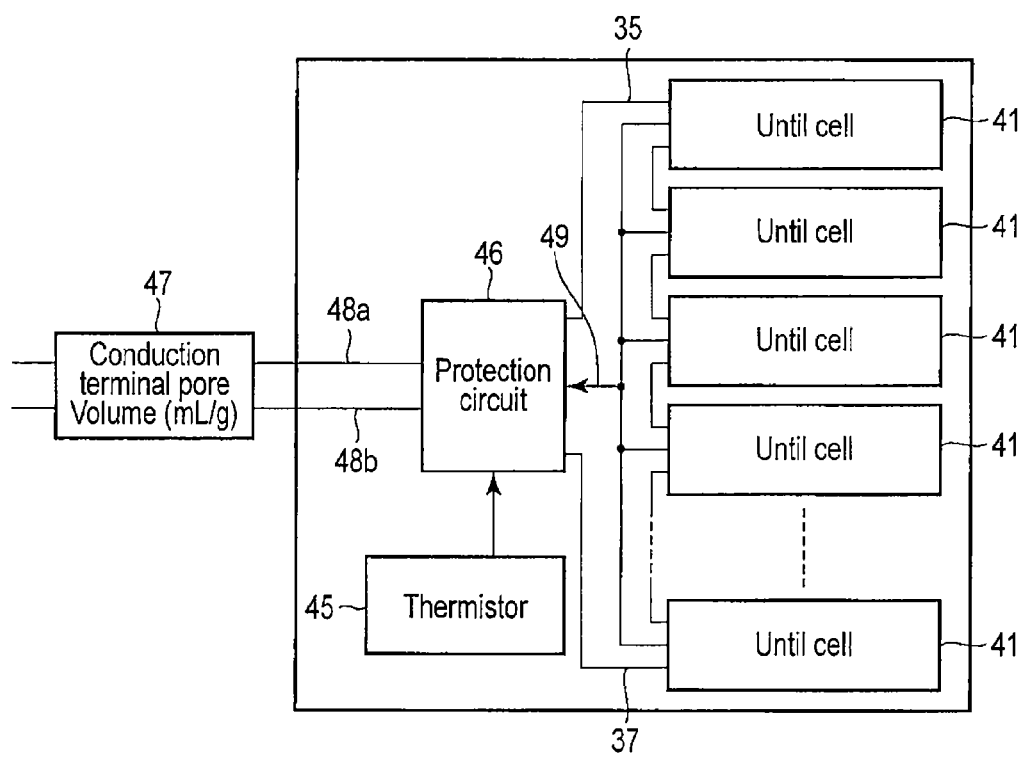
FIG. 5 is a block diagram showing an electric circuit of the battery pack according to the second embodiment of the present invention.

On the printed wiring board 32, as shown in FIG. 5, a thermistor 45, a protection circuit 46, and a terminal 47 for conduction with an external device are mounted.

The thermistor 45 is used for detecting a temperature of the unit battery 41, and a detection signal is sent to a protection circuit 46.

The protection circuit 46 is capable of interrupting wirings 48a, 48b between the protection circuit 46 and a conduction terminal 47 to the external device under predetermined conditions as shown in FIG. 5. The predetermined conditions mean the case when a detection temperature of the thermistor 45 becomes equal to or higher than a predetermined temperate, and excessive charging, excessive discharge, excessive current, or the like of the unit battery 42 is detected, and the like. The detection is performed on each of the unit batteries 41 or for the entire unit batteries. In the case of the detection on each of the unit batteries 41, a battery voltage may be detected, or a positive electrode potential or a negative electrode potential may be detected. In the latter case, a lithium electrode is inserted into each of the unit batteries 41 as a reference electrode. In the case of FIG. 5, the protection circuit 46 is provided with a battery voltage monitoring circuit unit. Each of the unit batteries 41 is connected to the battery voltage monitoring circuit unit via a wiring 49. With such configuration, it is possible to detect the battery voltage of each of the unit batteries 41 by the protection circuit 46.

A heat shrinkable tube may be used in place of the adhesive tape 39. In this case, the protection sheet 31 is disposed on each of both surfaces of the laminate body 40, and the heat shrinkable tube is wound around, and then the heat shrinkable tube is subjected to heat shrinkage to bind the laminate body 40.

Though the unit batteries 41 shown in FIG. 4 are connected serially, they may be connected parallelly in order to increase a capacity of the battery pack. Of course, assembled battery packs may be connected serially and parallelly. The mode of the battery pack may be appropriately modified depending on usage.

Third Embodiment

A vehicle according to the third embodiment is provided with the battery pack according to the second embodiment. Examples of the vehicle include a hybrid electric vehicle having two to four wheels, an electric vehicle having two to four wheels, an assisted bicycle, and the like.

Figure 6:
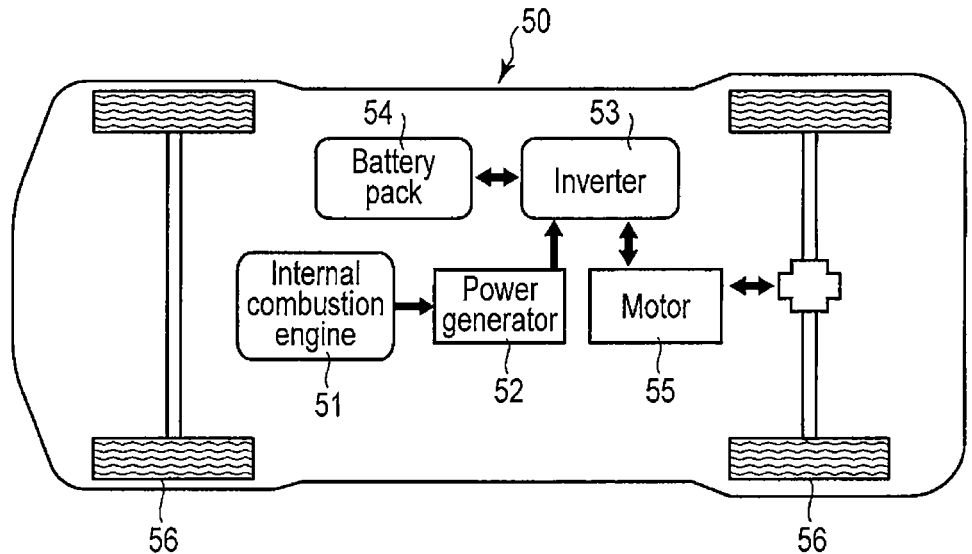
FIG. 6 is a typical view showing a series hybrid vehicle according to a third embodiment of the present invention.
Figure 7:
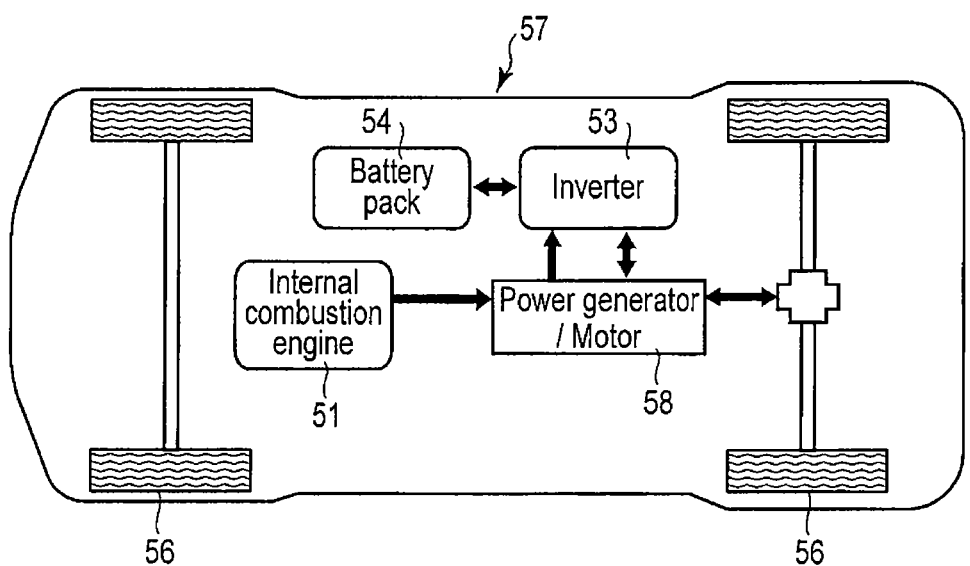
FIG. 7 is a typical view showing a parallel hybrid vehicle according to the third embodiment of the present invention.

FIGS. 6 to 8 show a hybrid type vehicle utilizing a combination of an internal combustion engine and a battery drive electric motor as the running power source. As the driving force of a vehicle, a power source enabling a wide range of rotations and torque according to running conditions is required. Generally, internal combustion engines are limited in torque/number of rotations at which the ideal energy efficiency is obtained, and therefore the energy efficiency is reduced in the operating conditions other than the above specified condition. In the case of hybrid type vehicles, the internal combustion engine is operated under the optimum condition to generate power and the wheels are driven by a highly efficient electric motor. Also, a vehicle of this type is driven by the motive powers of an internal combustion engine and electric motor. The energy efficiency of the whole vehicle can be thereby improved. Also, the vehicle's kinetic energy is recovered as electric power when the vehicle is decelerated. For this reason, the mileage per unit fuel can be increased more significantly than a usual vehicle driven only by an internal combustion engine.

Hybrid vehicles can be roughly classified into three categories based on the combination of internal combustion engine and electric motor.

FIG. 6 shows a hybrid vehicle 50, which is generally called a series hybrid vehicle. The entire motive force of an internal combustion engine 51 is converted into electric power by a generator 52 and this electric power is stored in a battery pack 54 through an inverter 53. As the battery pack 54, one having the above structure is used. The electric power of the battery pack 54 is supplied to an electric motor 55 through the inverter 53 and a wheel 56 is driven by the electric motor 55. This is a system using a generator in an electric vehicle. The internal combustion engine can be operated in a highly efficient condition and the power can be recovered. On the other hand, the wheel can be driven only by an electric motor and a high-output electric motor is therefore required. Also, as to the battery pack, one having a relatively large capacity is required. Preferably, the rated capacity of the battery pack is 5 to 50 Ah and more preferably 10 to 20 Ah. Here, the rated capacity means a capacity obtained when discharged at the rate of 0.2 C.

FIG. 7 shows a hybrid vehicle 57 known as a parallel hybrid vehicle. The symbol 58 shows an electric motor doubling as a generator. The internal combustion engine 51 mainly drives the wheel 56, and a part of the motive force is sometimes converted into electric power by the generator 58 and the battery pack 54 is charged by the electric power. When the vehicle is started or accelerated, accompanied by an increase in load, the motive force is supplemented by the electric motor 58. This system is based on a usual vehicle, the internal combustion engine 51 of which is reduced in load variation, to thereby obtain high efficiency and also ensure power recovery. Because the wheel 56 is driven mainly by the internal combustion engine 51, the output of the electric motor 58 can be arbitrarily determined according to the ratio of the aid to the drive force. The system can be constituted even using a relatively small electric motor 58 and a battery pack 54 having a relatively low capacity. The rated capacity of the battery pack is 1 to 20 Ah and more preferably 5 to 10 Ah.

FIG. 8 shows a hybrid vehicle 59 known as a series-parallel hybrid vehicle. This is a system comprising a combination of series and parallel assemblies. A motive force dividing mechanism 60 divides the output of the internal combustion engine 51 into a generating use and a wheel-driving use. The engine load is more finely controlled than in the case of a parallel system, making it possible to improve energy efficiency.

A rated capacity of the battery pack may preferably be within a range between 1 and 20 Ah. A more preferred range is between 5 and 10 Ah.

A nominal voltage of the battery pack to be mounted in the hybrid vehicles as shown in FIG. 6 to FIG. 8 may preferably be within a range of 200 to 600 V.

The battery pack 54 is preferably disposed in a place where it is scarcely affected by the influence of variations in atmospheric temperature or impact of collisions and the like. In a sedan-type vehicle as shown in, for example, FIG. 9, the battery pack 54 may be disposed in a trunk room 62 at the rear of a back seat 61. The battery pack 54 may be disposed under or behind the seat 61. In the case where the battery has a large weight, it is preferable to dispose the battery pack under the seat or floor to lower the center of gravity of the whole vehicle.

Hereinafter, examples of the present invention will be described, and it should be understood that the examples described below are not limitative insofar as the examples do not deviate from the spirit of the present invention.

Example 1

Positive Electrode Production

A layered lithium nickel cobalt manganese oxide ($Li_{1.05}Ni_{0.34}Co_{0.33}Mn_{0.33}O_2$) having a BET specific surface area of 0.7 m$^2$/g and an average particle diameter of 12.5 μm and a particulate matter of a lithium cobalt composite oxide ($LiCoO_2$) having a BET specific surface area of 0.5 m$^2$/g and an average particle diameter of 5 μm, of which a surface is coated with an Mg oxide, were used as active materials; graphite and acetyl black were used as a conductive agent; and PVdF was used for a binder.

For particle diameter measurement of the active material, a laser diffraction type distribution measurement device (Shimadzu SALD-300) was used. More specifically, about 0.1 g of a sample was placed in a beaker, and a surfactant and 1 to 2 mL of distilled water were added, followed by sufficient stirring. After that, the content of the beaker was injected into a mixing vessel, and luminosity distribution was measured for 64 times at an interval of 2 seconds. The obtained particle distribution data were analyzed to measure the particle diameter of the active material.

TEM/EDX analysis of the lithium cobalt composite oxide ($LiCoO_2$) of which surfaces were coated with the Mg oxide was conducted according to the method as described above, and it was detected that 90% of the surfaces was coated with the Mg oxide (MgO).

Subsequently, 80 parts by weight of the layered lithium nickel cobalt manganese oxide ($Li_{1.05}Ni_{0.34}Co_{0.33}Mn_{0.33}O_2$) and 20 parts by weight of the lithium cobalt composite oxide ($LiCoO_2$) of which surfaces were coated with the Mg oxide were mixed in a henschel mixer to obtain a mixture (active material).

Next, N-methylpyrrolidone (NMP) was added to 90 parts by weight of the obtained mixture, 3 parts by weight of the graphite, 3 parts by weight of the acetylene black, and 4 parts by weight of PVdF in such a manner as to attain a solid content ratio of 68 wt %. A slurry was prepared by kneading the mixture in a planetary mixer and gradually reducing the solid content ratio by adding NMP. The slurry was further dispersed by rotating a bead mill using zirconia beads each having a diameter of 1 mm under the conditions of a rotation speed of 800 rpm for 60 minutes to prepare final slurry. The slurry was coated on each of both surfaces of a current collector made from an aluminum foil having a thickness of 15 μm and dried, followed by press molding, thereby obtaining a positive electrode in which a positive electrode layer is formed on both surfaces of the current collector. In the positive electrode, a coating amount of the positive electrode layer (positive electrode basis weight) was 150 g/m² and a density was 3.0 g/cm³.

A pore diameter distribution by mercury intrusion of the obtained positive electrode was measured by the method described below.

The pore diameter distribution measurement of the positive electrode was conducted by employing the mercury intrusion. As a measurement device, Shimadzu Autopore 9520 was used. A sample was obtained by cutting the positive electrode into pieces each having the size of 25×25 mm², and the sample was folded and placed in a measurement battery. The measurement was conducted under the conditions of an initial pressure of 20 kPa (about 3 psia, corresponding to a pore diameter of about 60 μm). For data reduction, a pore specific surface area was calculated by setting the shape of a pore as a cylindrical shape. A pore diameter which is most frequently found in the pore diameter distribution was set as a mode diameter of the positive electrode.

The analysis principle of the mercury intrusion is based on the following expression (2) of Washburn:

$$D = -4\gamma \cos\theta / p \qquad (2)$$

Here, P represents a pressure to be applied; D represents a pore diameter; γ represents a surface tension of mercury (480 dyne·cm⁻¹); and θ represents a contact angle between mercury and pore wall surface which is 140°. Since γ and θ are constant, a relationship between the applied pressure P and the pore diameter D is detected by the Washburn expression (2), and a pore diameter and a volume distribution thereof are derived by measuring a mercury intrusion volume at the relationship. For details of the measurement method, principle, and the like, please refer to Motoji Jinbo et al., "Fine Particle Handbook", Asakura Shoten (1991); edited by Sohachiro Hayakawa, "Methods for Measuring Physical Properties of Powders", Asakura Shoten (1978); and the like.

As a result, a pore volume per 1 g of the positive electrode weight (positive electrode layer weight) excluding the weight of the current collector was 0.079 mL/g within a pore diameter range of 0.01 to 1.0 μm. A pore surface area per 1 g of the positive electrode weight, which excludes the weight of the current collector, was 2.40 m²/g within the pore diameter range of 0.01 and 1.0 μm. Further, a mode diameter within the range of 0.01 to 1.0 μm was 0.25 μm.

<Negative Electrode Production>

A spinel type lithium titanate ($Li_4Ti_5O_{12}$) powder having an average particle diameter of 0.82 μm, a BET specific surface area of 10.4 m²/g, and a lithium absorption/desorption potential of 1.55 V (vs. Li/Li⁺) was prepared as an active material.

N-methylpyrrolidone (NMP) was added to 90 wt % of the active material, 5 wt % of cokes ($d_{002}$: 0.3465 nm, average particle diameter: 8.2 μm, BET specific surface area: 1.2 m²/g) which was calcinated at 1300° C. as a conductive agent (carbonaceous material), and 5 wt % of polyvinylidene fluoride (PVdF) in such a manner as to attain a solid content ratio of 62 wt %. A slurry having a viscosity of 10.2 cp (detected by type-B viscometer at 50 rpm) was prepared by kneading the mixture in a planetary mixer and gradually reducing the solid content ratio by adding NMP. The slurry was further mixed in a bead mill using zirconia beads each having a diameter of 1 mm. The slurry was coated on each of both surfaces of a current collector made from an aluminum foil (purity: 99.3 wt %, average crystal grain diameter: 10 μm) having a thickness of 15 μm and dried to obtain a negative electrode layer, and then the negative electrode layer was subjected to roll pressing using a roll which was heated to 100° C., thereby producing a negative electrode having a density of 2.35 g/cm³ and porosity of 32.7%.

<Preparation of Non-Aqueous Electrolyte>

1.2M $LiPF_6$ was mixed with a mixture solution obtained by mixing propylene carbonate (PC) and diethyl carbonate (DEC) at a ratio of 1:2 by a volume ratio to obtain a non-aqueous electrolyte.

<Electrode Unit Production>

After laminating the positive electrode, a separator, the negative electrode, and the separator in this order, the laminate was wound in the form of a swirl. The separator used herein had a thickness of 25 μm and was formed of a porous film made from polyethylene. The electrodes and separators were heat-pressed at 80° C. to obtain a flat electrode unit having a width of 30 mm and a thickness of 1.6 mm. The obtained electrode unit was housed in a pack formed of a laminate film having a three-layer structure of nylon layer/ aluminum layer/polyethylene layer and a thickness of 0.1 mm and then subjected to vacuum drying at 80° C. for 24 hours.

The liquid non-aqueous electrolyte was injected into the laminate film pack in which the electrode unit was housed, and then the pack was completely sealed by heat sealing, thereby obtaining a non-aqueous electrolyte secondary battery having the structure shown in FIG. 2, a width of 35 mm, a thickness of 2.0 mm, and a height of 65 mm.

Example 2

A layered lithium nickel cobalt manganese oxide ($Li_{1.05}Ni_{0.5}Co_{0.2}Mn_{0.3}O_2$) having a BET specific surface area of 0.8 m²/g and an average particle diameter of 6 μm was prepared.

Subsequently, 80 parts by weight of the layered lithium nickel cobalt manganese oxide and 20 parts by weight of a particulate matter of a lithium cobalt composite oxide (same as that used in Example 1) of which surfaces were coated with an Mg oxide were mixed in the same manner as in Example 1 to obtain a mixture (active material).

Next, N-methylpyrrolidone (NMP) was added to 90 parts by weight of the mixture, 3 parts by weight of graphite, 3 parts by weight of acetylene black, and 4 parts by weight of PVdF in such a manner as to attain a solid content ratio of 68 wt %. A slurry was prepared by kneading the mixture in a planetary mixer and gradually reducing the solid content ratio by adding NMP. The slurry was further dispersed by rotating a bead mill using zirconia beads each having a diameter of 1 mm under the conditions of rotation speed of 500 rpm for 30 minutes to prepare final slurry. The slurry was coated on each of both surfaces of a current collector made from an aluminum foil having a thickness of 15 μm and dried, followed by press molding, thereby obtaining a positive electrode in which a positive electrode layer is formed on both surfaces of the current collector. In the positive electrode, a coating amount of the positive electrode layer (positive electrode basis weight) was 150 g/m² and a density was 3.15 g/cm³.

A pore volume, a pore surface area, and a mode diameter within the range of 0.01 to 1.0 μm of the obtained positive electrode were measured in the same manner as in Example 1. As a result, the pore volume per 1 g of the positive electrode weight (positive electrode layer weight) excluding the current collector weight was 0.063 mL/g within the range of 0.01 to 1.0 μm. The pore surface area per 1 g of the positive electrode weight which excludes the current collector weight was 2.91 m²/g within the range of 0.01 to 1.0 μm.

Further, the mode diameter within the range of 0.01 to 1.0 μm was 0.125 μm.

A non-aqueous electrolyte battery was assembled in the same manner as in Example 1 by using the above-described positive electrode.

Example 3

A layered lithium nickel cobalt manganese oxide ($Li_{1.1}Ni_{0.49}Co_{0.2}Mn_{0.3}Mg_{0.01}O_2$) having a BET specific surface area of 0.85 m²/g and an average particle diameter of 4.6 μm was prepared.

A lithium cobalt composite oxide ($LiCoO_2$) having a BET specific surface area of 0.4 m²/g and an average particle diameter of 6 μm, of which surfaces were coated with an Mg oxide, was prepared as the lithium cobalt composite oxide. The lithium cobalt composite oxide was subjected to the TEM/EDX analysis according to the above-described method to find that 80% of each of the surfaces was coated with the Mg oxide (MgO).

Subsequently, 80 parts by weight of the layered lithium nickel cobalt manganese oxide and 20 parts by weight of a particulate matter of the lithium cobalt composite oxide of which surfaces were coated with the Mg oxide were mixed in the same manner as in Example 1 to obtain a mixture (active material).

Next, a positive electrode in which a positive electrode layer was formed on each of both surfaces of a current collector was produced in the same manner as in Example 2. In the positive electrode, a coating amount of the positive electrode layer (positive electrode basis weight) was 150 g/m² and a density was 3.15 g/cm³.

A pore volume, a pore surface area, and a mode diameter within the range of 0.01 to 1.0 μm of the obtained positive electrode were measured in the same manner as in Example 1. As a result, the pore volume per 1 g of the positive electrode weight (positive electrode layer weight) excluding the current collector weight was 0.074 mL/g within the range of 0.01 to 1.0 μm. The pore surface area per 1 g of the positive electrode weight (positive electrode layer weight) excluding the current collector weight was 3.11 m²/g within the range of 0.01 to 1.0 μm.

Further, the mode diameter within the range of 0.01 to 1.0 μm was 0.17 μm.

A non-aqueous electrolyte battery was assembled in the same manner as in Example 1 by using the above-described positive electrode.

Example 4

A layered lithium nickel cobalt manganese oxide ($Li_{1.1}Ni_{0.49}Co_{0.2}Mn_{0.3}Zr_{0.01}O_2$) having a BET specific surface area of 0.8 m²/g and an average particle diameter of 6 μm was prepared.

A lithium cobalt composite oxide ($LiCoO_2$) having a BET specific surface area of 0.4 m²/g and an average particle diameter of 6 μm, of which surfaces were coated with an Mg oxide, was prepared as the lithium cobalt composite oxide. The lithium cobalt composite oxide was subjected to the TEM/EDX analysis according to the above-described method to find that 60% of each of the surfaces was coated with the Mg oxide (MgO).

Subsequently, 80 parts by weight of the layered lithium nickel cobalt manganese oxide and 20 parts by weight of a particulate matter of the lithium cobalt composite oxide of which surfaces were coated with the Mg oxide were mixed in the same manner as in Example 1 to obtain a mixture (active material).

Next, N-methylpyrrolidone (NMP) was added to 90 parts by weight of the mixture, 3 parts by weight of graphite, 3 parts by weight of acetylene black, and 4 parts by weight of PVdF in such a manner as to attain a solid content ratio of 68 wt %. A slurry was prepared by kneading the mixture in a planetary mixer and gradually reducing the solid content ratio by adding NMP. The slurry was coated on each of both surfaces of a current collector made from an aluminum foil having a thickness of 15 μm and dried, followed by press molding, thereby obtaining a positive electrode in which a positive electrode layer is formed on both surfaces of the current collector. In the positive electrode, a coating amount of the positive electrode layer (positive electrode basis weight) was 150 g/m² and a density was 3.15 g/cm³.

A pore volume, a pore surface area, and a mode diameter within the range of 0.01 to 1.0 μm of the obtained positive electrode were measured in the same manner as in Example 1. As a result, the pore volume per 1 g of the positive electrode weight (positive electrode layer weight) excluding the current collector weight was 0.076 mL/g within the range of 0.01 to 1.0 μm. The pore surface area per 1 g of the positive electrode weight (positive electrode layer weight) excluding the current collector weight was 2.86 m²/g within the range of 0.01 to 1.0 μm.

Further, the mode diameter within the range of 0.01 to 1.0 μm was 0.25 μm.

A non-aqueous electrolyte battery was assembled in the same manner as in Example 1 by using the above-described positive electrode.

Example 5

A layered lithium nickel cobalt manganese oxide ($Li_{1.1}Ni_{0.49}Co_{0.2}Mn_{0.3}Zr_{0.01}O_2$) having a BET specific surface area of 0.3 m²/g and an average particle diameter of 10 μm was prepared.

A lithium cobalt composite oxide ($LiCoO_2$) having a BET specific surface area of 0.4 m²/g and an average particle diameter of 6 µm, of which surfaces were coated with an Mg oxide, was prepared as the lithium cobalt composite oxide. The lithium cobalt composite oxide was subjected to the TEM/EDX analysis according to the above-described method to find that 100% of each of the surfaces was coated with the Mg oxide (MgO).

Subsequently, 80 parts by weight of the layered lithium nickel cobalt manganese oxide and 20 parts by weight of a particulate matter of the lithium cobalt composite oxide of which surfaces were coated with the Mg oxide were mixed in the same manner as in Example 1 to obtain a mixture (active material).

Next, a positive electrode in which a positive electrode layer was formed on each of both surfaces of a current collector was produced in the same manner as in Example 2. In the positive electrode, a coating amount of the positive electrode layer (positive electrode basis weight) was 150 g/m$^2$ and a density was 3.15 g/cm$^3$.

A pore volume, a pore surface area, and a mode diameter within the range of 0.01 to 1.0 µm of the obtained positive electrode were measured in the same manner as in Example 1. As a result, the pore volume per 1 g of the positive electrode weight (positive electrode layer weight) excluding the current collector weight was 0.06 mL/g within the range of 0.01 to 1.0 µm. The pore surface area per 1 g of the positive electrode weight (positive electrode layer weight) excluding the current collector weight was 2.64 m$^2$/g within the range of 0.01 to 1.0 µm.

Further, the mode diameter within the range of 0.01 to 1.0 µm was 0.17 µm.

A non-aqueous electrolyte battery was assembled in the same manner as in Example 1 by using the above-described positive electrode.

Example 6

The layered lithium nickel cobalt manganese oxide the same as that used in Example 5 was used, and a particulate matter of a lithium cobalt composite oxide (LiCoO$_2$) having a BET specific surface area of 0.5 m$^2$/g and an average particle diameter of 5 µm, of which surfaces were coated with a Zr oxide, was prepared as the lithium cobalt composite oxide (LiCoO$_2$). The lithium cobalt composite oxide was subjected to the TEM/EDX analysis according to the above-described method to find that 100% of each of the surfaces was coated with the Zr oxide (ZrO$_2$).

Next, a positive electrode in which a positive electrode layer was formed on each of both surfaces of a current collector was produced in the same manner as in Example 2. In the positive electrode, a coating amount of the positive electrode layer (positive electrode basis weight) was 150 g/m$^2$ and a density was 3.1 g/cm$^3$.

A pore volume, a pore surface area, and a mode diameter within the range of 0.01 to 1.0 µm of the obtained positive electrode were measured in the same manner as in Example 1. As a result, the pore volume per 1 g of the positive electrode weight (positive electrode layer weight) excluding the current collector weight was 0.063 mL/g within the range of 0.01 to 1.0 µm. The pore surface area per 1 g of the positive electrode weight (positive electrode layer weight) excluding the current collector weight was 2.6 m$^2$/g within the range of 0.01 to 1.0 µm.

Further, the mode diameter within the range of 0.01 to 1.0 µm was 0.2 µm.

A non-aqueous electrolyte battery was assembled in the same manner as in Example 1 by using the above-described positive electrode.

Example 7

The layered lithium nickel cobalt manganese oxide the same as that used in Example 5 was used, and a particulate matter of a lithium cobalt composite oxide (LiCoO$_2$) having a BET specific surface area of 0.5 m$^2$/g and an average particle diameter of 5.5 µm, of which surfaces were coated with a Al oxide, was prepared as the lithium cobalt composite oxide (LiCoO$_2$). The lithium cobalt composite oxide was subjected to the TEM/EDX analysis according to the above-described method to find that 100% of each of the surfaces was coated with the Al oxide (Al$_2$O$_3$).

Next, a positive electrode in which a positive electrode layer was formed on each of both surfaces of a current collector was produced in the same manner as in Example 2. In the positive electrode, a coating amount of the positive electrode layer (positive electrode basis weight) was 150 g/m$^2$ and a density was 3.0 g/cm$^3$.

A pore volume, a pore surface area, and a mode diameter within the range of 0.01 to 1.0 µm of the obtained positive electrode were measured in the same manner as in Example 1. As a result, the pore volume per 1 g of the positive electrode weight (positive electrode layer weight) excluding the current collector weight was 0.078 mL/g within the range of 0.01 to 1.0 µm. The pore surface area per 1 g of the positive electrode weight (positive electrode layer weight) excluding the current collector weight was 2.5 m$^2$/g within the range of 0.01 to 1.0 µm.

Further, the mode diameter within the range of 0.01 to 1.0 µm was 0.23 µm.

A non-aqueous electrolyte battery was assembled in the same manner as in Example 1 using the above-described positive electrode.

Example 8

The layered lithium nickel cobalt manganese oxide the same as that used in Example 3 was used, and a particulate matter of a lithium cobalt composite oxide (LiCoO$_2$) having a BET specific surface area of 0.5 m$^2$/g and an average particle diameter of 5 µm, of which surfaces were coated with aluminum phosphate (AlPO$_4$), was prepared as the lithium cobalt composite oxide (LiCoO$_2$). The lithium cobalt composite oxide was subjected to the TEM/EDX analysis according to the above-described method to find that 90% of each of the surfaces was coated with the aluminum phosphate (AlPO$_4$).

Next, a positive electrode in which a positive electrode layer was formed on each of both surfaces of a current collector was produced in the same manner as in Example 2 except for setting the dispersion time by the bead mill 60 minutes. In the positive electrode, a coating amount of the positive electrode layer (positive electrode basis weight) was 150 g/m$^2$ and a density was 3.0 g/cm$^3$.

A pore volume, a pore surface area, and a mode diameter within the range of 0.01 to 1.0 µm of the obtained positive electrode were measured in the same manner as in Example 1. As a result, the pore volume per 1 g of the positive electrode weight (positive electrode layer weight) excluding the current collector weight was 0.11 mL/g within the range of 0.01 to 1.0 µm. The pore surface area per 1 g of the positive electrode weight (positive electrode layer weight) excluding the current collector weight was 4.09 m²/g within the range of 0.01 to 1.0 µm.

Further, the mode diameter within the range of 0.01 to 1.0 µm was 0.204 µm.

A non-aqueous electrolyte battery was assembled in the same manner as in Example 1 using the above-described positive electrode.

Example 9

The layered lithium nickel cobalt manganese oxide the same as that used in Example 3 was used, and a particulate matter of a lithium cobalt composite oxide (LiCoO$_2$) having a BET specific surface area of 0.5 m²/g and an average particle diameter of 5 µm, of which surfaces were coated with magnesium fluoride (MgF$_2$), was prepared as the lithium cobalt composite oxide (LiCoO$_2$). The lithium cobalt composite oxide was subjected to the TEM/EDX analysis according to the above-described method to find that 80% of each of the surfaces was coated with the magnesium fluoride (MgF$_2$).

Next, a positive electrode in which a positive electrode layer was formed on each of both surfaces of a current collector was produced in the same manner as in Example 2 except for setting the dispersion time by the bead mill 60 minutes. In the positive electrode, a coating amount of the positive electrode layer (positive electrode basis weight) was 150 g/m² and a density was 3.0 g/cm³.

A pore volume, a pore surface area, and a mode diameter within the range of 0.01 to 1.0 µm of the obtained positive electrode were measured in the same manner as in Example 1. As a result, the pore volume per 1 g of the positive electrode weight (positive electrode layer weight) excluding the current collector weight was 0.17 mL/g within the range of 0.01 to 1.0 µm. The pore surface area per 1 g of the positive electrode weight (positive electrode layer weight) excluding the current collector weight was 5.0 m²/g within the range of 0.01 to 1.0 µm.

Further, the mode diameter within the range of 0.01 to 1.0 µm was 0.2 µm.

A non-aqueous electrolyte battery was assembled in the same manner as in Example 1 using the above-described positive electrode.

Comparative Example 1

A layered lithium nickel cobalt manganese oxide (Li$_{1.05}$Ni$_{0.34}$Co$_{0.33}$Mn$_{0.33}$O$_2$) the same as that of Example 1 and a particulate matter of a lithium cobalt composite oxide (LiCoO$_2$) the same as that of Example 1, of which surfaces were coated with an Mg oxide, were prepared.

Subsequently, 80 parts by weight of the layered lithium nickel cobalt manganese oxide and 20 parts by weight of the particulate matter of the lithium cobalt composite oxide of which surfaces were coated with an Mg oxide were mixed in the same manner as in Example 1 to obtain a mixture (active material).

Next, N-methylpyrrolidone (NMP) was added to 90 parts by weight of the mixture, 3 parts by weight of graphite, 3 parts by weight of acetylene black, and 4 parts by weight of PVdF in such a manner as to attain a solid content ratio of 68 wt %. A slurry was prepared by kneading the mixture in a planetary mixer and gradually reducing the solid content ratio by adding NMP. The slurry was further dispersed by rotating a bead mill using zirconia beads each having a diameter of 1 mm under the conditions of rotation speed of 1500 rpm for 60 minutes to prepare a slurry. The slurry was coated on each of both surfaces of a current collector made from an aluminum foil having a thickness of 15 µm and dried, followed by press molding, thereby obtaining a positive electrode in which a positive electrode layer is formed on both surfaces of the current collector. In the positive electrode, a coating amount of the positive electrode layer (positive electrode basis weight) was 150 g/m² and a density was 3.3 g/cm³.

A pore volume, a pore surface area, and a mode diameter within the range of 0.01 to 1.0 µm of the obtained positive electrode were measured in the same manner as in Example 1. As a result, the pore volume per 1 g of the positive electrode weight (positive electrode layer weight) excluding the current collector weight was 0.054 mL/g within the range of 0.01 to 1.0 µm. The pore surface area of the positive electrode per 1 g of the positive electrode weight (positive electrode layer weight) excluding the current collector weight was 2.3 m²/g within the range of 0.01 to 1.0 µm.

Further, the mode diameter within the range of 0.01 to 1.0 µm was 0.15 µm.

A non-aqueous electrolyte battery was assembled in the same manner as in Example 1 using the above-described positive electrode.

Comparative Example 2

A layered lithium nickel cobalt manganese oxide (Li$_{1.1}$Ni$_{0.49}$Co$_{0.2}$Mn$_{0.3}$Zr$_{0.01}$O$_2$) the same as that of Example 5 and a particulate matter of a lithium cobalt composite oxide (LiCoO$_2$) the same as that of Example 5, of which surfaces were coated with an Mg oxide, were prepared.

Subsequently, 80 parts by weight of the layered lithium nickel cobalt manganese oxide and 20 parts by weight of the particulate matter of the lithium cobalt composite oxide of which surfaces were coated with an Mg oxide were mixed in the same manner as in Example 1 to obtain a mixture (active material).

Next, N-methylpyrrolidone (NMP) was added to 90 parts by weight of the mixture, 3 parts by weight of graphite, 3 parts by weight of acetylene black, and 4 parts by weight of PVdF in such a manner as to attain a solid content ratio of 68 wt %. A slurry was prepared by kneading the mixture in a planetary mixer and gradually reducing the solid content ratio by adding NMP. The slurry was further dispersed by rotating a bead mill using zirconia beads each having a diameter of 1 mm under the conditions of rotation speed of 1000 rpm for 60 minutes to prepare a slurry. The slurry was coated on each of both surfaces of a current collector made from an aluminum foil having a thickness of 15 µm and dried, followed by press molding, thereby obtaining a positive electrode in which a positive electrode layer is formed on both surfaces of the current collector. In the positive electrode, a coating amount of the positive electrode layer (positive electrode basis weight) was 150 g/m² and a density was 2.7 g/cm³.

A pore volume, a pore surface area, and a mode diameter within the range of 0.01 to 1.0 µm of the obtained positive electrode were measured in the same manner as in Example 1. As a result, the pore volume per 1 g of the positive electrode weight (positive electrode layer weight) excluding the current collector weight was 0.19 mL/g within the range of 0.01 to 1.0 µm. The pore surface area of the positive electrode per 1 g of the positive electrode weight (positive electrode layer weight) excluding the current collector weight was 2.3 m²/g within the range of 0.01 to 1.0 µm.

Further, the mode diameter within the range of 0.01 to 1.0 µm was 0.34 µm.

A non-aqueous electrolyte battery was assembled in the same manner as in Example 1 using the above-described positive electrode.

Comparative Example 3

A positive electrode was obtained in the same manner as in Example 1 except for using a particulate matter of a lithium cobalt composite oxide (LiCoO$_2$) of which surfaces were not coated with any metal compound as the lithium cobalt composite oxide.

In the positive electrode, a coating amount of the positive electrode layer (positive electrode basis weight) was 150 g/m$^2$ and a density was 2.9 g/cm$^3$.

A pore volume, a pore surface area, and a mode diameter within the range of 0.01 to 1.0 µm of the obtained positive electrode were measured in the same manner as in Example 1. As a result, the pore volume per 1 g of the positive electrode weight (positive electrode layer weight) excluding the current collector weight was 0.081 mL/g within the range of 0.01 to 1.0 µm. The pore surface area of the positive electrode per 1 g of the positive electrode weight (positive electrode layer weight) excluding the current collector weight was 2.4 m$^2$/g within the range of 0.01 to 1.0 µm.

Further, the mode diameter within the range of 0.01 to 1.0 µm was 0.26 µm.

A non-aqueous electrolyte battery was assembled in the same manner as in Example 1 using the above-described positive electrode.

Each of the non-aqueous electrolyte battery obtained by Example 1 to Example 9 and Comparative Examples 1 to 3 was subjected to a cycle test in which 3 C charging/3 C discharging including charging to 2.9 V at a charging rate of 3 C, 10 minutes of resting, and discharging to 1.5 V at a discharge rate of 3 C was repeated under an environment of 45° C., and the number of cycles by which a capacity became 80% of an initial 3 C discharge capacity was evaluated as a cycle life. The cycle lives are shown Table 1.

Further, a change in battery thickness at the time of termination of the test (a rate of increase relative to an initial battery thickness is indicated by percentage) is shown together with the cycle lives in Table 1.

firmed that the batteries of Examples 1 to 9 had longer cycle lives as compared to the batteries of Comparative Examples 1 to 3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-aqueous electrolyte battery comprising:
an outer case;
a negative electrode housed in the outer case and comprising a current collector and a negative electrode layer formed on at least one of surfaces of the current collector;
a positive electrode housed in the outer case and comprising a current collector and a porous positive electrode layer formed on at least one of surfaces of the current collector and opposed to the negative electrode layer; and
a non-aqueous electrolyte filled in the outer case and comprising a lithium salt,
wherein the negative electrode layer comprises an active material having a lithium absorption/desorption potential of 0.4 V vs. Li/Li$^+$ or more,
the porous positive electrode layer comprises layered lithium nickel cobalt manganese composite oxide particles as an active material and a binder,
the porous positive electrode layer has a pore volume with a pore diameter of 0.01 µm or more and 1.0 µm or less obtained by the mercury press-in method, the pore volume being 0.06 mL or more and 0.25 mL or less per 1 g of a weight of the positive electrode layer, and
a pore surface area within the pore volume range is 2.4 m$^2$/g or more and 8 m$^2$/g or less.

2. The battery of claim 1, wherein a mode diameter within a range of 0.01 µm to 1.0 µm in a pore diameter distribution of

TABLE 1

|  | Electrode density (g/cm$^3$) | Pore volume (mL/g) | Pore surface area (m$^2$/g) | Mode diameter (µm) | Number of cycles (times) | Battery expansion (%) |
| --- | --- | --- | --- | --- | --- | --- |
| Example 1 | 3.0 | 0.079 | 2.4 | 0.25 | 3000 | 5 |
| Example 2 | 3.15 | 0.063 | 2.91 | 0.125 | 3500 | <1 |
| Example 3 | 3.15 | 0.074 | 3.11 | 0.17 | 3600 | <1 |
| Example 4 | 3.15 | 0.076 | 2.86 | 0.25 | 3300 | <1 |
| Example 5 | 3.15 | 0.06 | 2.64 | 0.17 | 3800 | <1 |
| Example 6 | 3.1 | 0.063 | 2.6 | 0.20 | 4000 | <1 |
| Example 7 | 3.0 | 0.078 | 2.5 | 0.23 | 3600 | 2 |
| Example 8 | 3.0 | 0.11 | 4.09 | 0.204 | 3700 | <1 |
| Example 9 | 3.0 | 0.17 | 5.0 | 0.200 | 3500 | <1 |
| Comparative Example 1 | 3.3 | 0.054 | 2.3 | 0.15 | 1200 | >100 |
| Comparative Example 2 | 2.7 | 0.19 | 2.3 | 0.34 | 900 | >100 |
| Comparative Example 3 | 2.9 | 0.081 | 2.4 | 0.26 | 750 | <1 |

As is apparent from Table 1, it was confirmed that the batteries of Examples 1 to 9 underwent less gas generation-related battery expansion after the cycle test at 45° C. than those in Comparative Examples 1 to 3. Further, it was conthe positive electrode layer obtained by the mercury press-in method is 0.1 µm or more and 0.25 µm or less.

3. The battery of claim 1, wherein the layered lithium nickel cobalt manganese composite oxide is represented by $Li_aNi_{1-x-y-z}Co_xMn_yM_zO_2$, where a, x, y, and z are $0.9 < a \leq 1.25$, $0 < x \leq 0.4$, $0 < y \leq 0.45$, and $0 \leq z \leq 0.1$, and M represents at least one element selected from Mg, Al, Si, Ti, Zn, Zr, Ca, and Sn.

4. The battery of claim 1, wherein the porous positive electrode layer further comprises a conductive agent, and a basis weight of the positive electrode layer is 100 g/m$^2$ or more and 200 g/m$^2$ or less.

5. The battery of claim 1, wherein the charging potential of the active material in the positive electrode is 4.3 V or more and 4.5 V or less based on a lithium electrode.

6. The battery of claim 1, wherein the active material in the negative electrode is a lithium titanium composite oxide.

7. A battery pack comprising one or more of the non-aqueous electrolyte battery of claim 1.

8. A vehicle comprising the battery pack of claim 7.

9. The battery of claim 1, wherein the lithium salt comprises lithium salts of lithium perchlorate (LiClO$_4$), lithium hexafluorophosphate (LiPF$_6$), lithium tetrafluoroborate (LiBF$_4$), lithium arsenic hexafluoride (LiAsF$_6$), lithium trifluoromethasulfonate (LiCF$_3$SO$_3$), and lithium bistrifluoromethylsulfonylimito [LiN(CF$_3$SO$_2$)$_2$] or a mixture thereof.

10. The battery of claim 1, wherein a proportion of the layered lithium nickel cobalt manganese composite oxide particles in total amount of the active material in the positive electrode layer is 60 wt % or more and 95 wt % or less.

11. The battery of claim 1, wherein the active material in the positive electrode layer further comprises lithium cobalt composite oxide particles in which at least a part of a surface of each of the particles is coated with a metal compound.

12. The battery of claim 11, wherein the metal compound is Al$_2$O$_3$, MgO, ZrO$_2$, AlPO$_4$, or MgF$_2$.

13. The battery of claim 1, wherein the pore volume is 0.06 mL or more and 0.17 mL or less per 1 g of a weight of the positive electrode layer and the pore surface area within the pore volume range is 2.4 m$^2$/g or more and 5 m$^2$/g or less.

14. The battery of claim 1, wherein the porous positive electrode layer has pores at least in the binder and between the layered lithium nickel cobalt manganese composite oxide particles and the binder.

* * * * *